United States Patent
Naitoh

(10) Patent No.: US 8,237,941 B2
(45) Date of Patent: Aug. 7, 2012

(54) IMAGE FORMATION SYSTEM AND APPLICATION PROGRAM INSTALLATION METHOD

(75) Inventor: Yoshiko Naitoh, Kawasaki (JP)

(73) Assignee: Canon Kabushiki Kaisha (JP)

( * ) Notice: Subject to any disclaimer, the term of this patent is extended or adjusted under 35 U.S.C. 154(b) by 987 days.

(21) Appl. No.: 12/237,378

(22) Filed: Sep. 24, 2008

(65) Prior Publication Data

US 2009/0091787 A1    Apr. 9, 2009

(30) Foreign Application Priority Data

Oct. 3, 2007    (JP) .................................. 2007-260359

(51) Int. Cl.
G06F 3/12      (2006.01)
G06F 9/44      (2006.01)
G06F 9/445     (2006.01)
G06K 15/00     (2006.01)

(52) U.S. Cl. ...... 358/1.13; 358/1.14; 717/172; 717/174; 717/176

(58) Field of Classification Search .................. None
See application file for complete search history.

(56) References Cited

U.S. PATENT DOCUMENTS

| 2004/0109188 | A1 | 6/2004 | Akiyoshi et al. |
| 2006/0004667 | A1* | 1/2006 | Neil .............................. 705/59 |
| 2008/0055625 | A1 | 3/2008 | Akiyoshi et al. |
| 2008/0066084 | A1 | 3/2008 | Akiyoshi et al. |
| 2008/0098389 | A1 | 4/2008 | Akiyoshi et al. |

FOREIGN PATENT DOCUMENTS

JP    2004-129246 A    4/2004

* cited by examiner

Primary Examiner — Thomas Lett
(74) Attorney, Agent, or Firm — Rossi, Kimms & McDowell LLP

(57) ABSTRACT

In an image formation system in which a plurality of image forming apparatuses operates cooperatively as a single virtual device, an instruction is accepted that designates an application to be installed and an apparatus as the destination for installing the application. Based on the functions of the plurality of image forming apparatuses that constitute the virtual device, it is determined whether or not the application to be installed operates on the apparatus that is the installation destination. In accordance with the determined result, an apparatus as an installation destination for installing the application and an installation method are displayed to allow selection of the apparatus as the installation destination and the installation method.

6 Claims, 20 Drawing Sheets

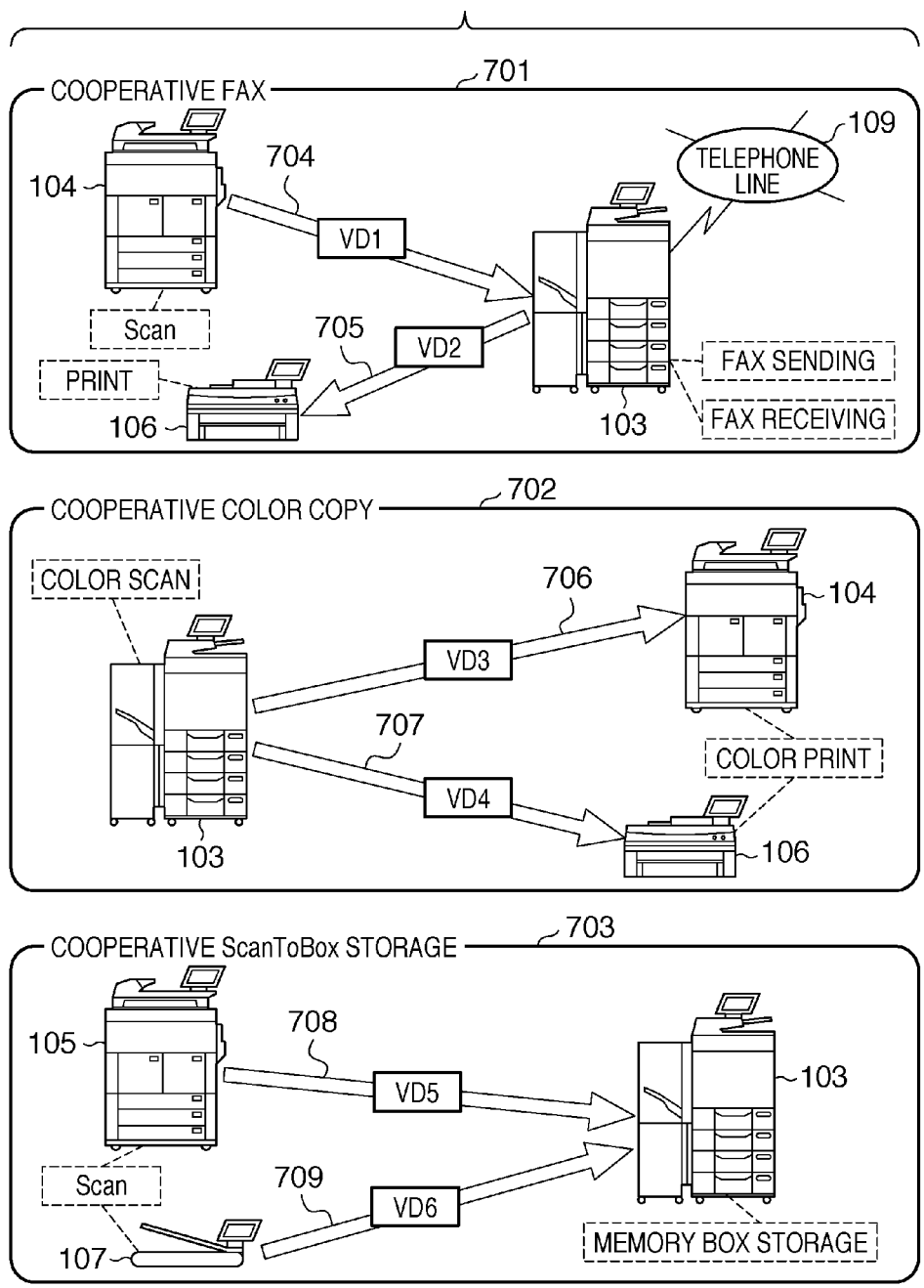

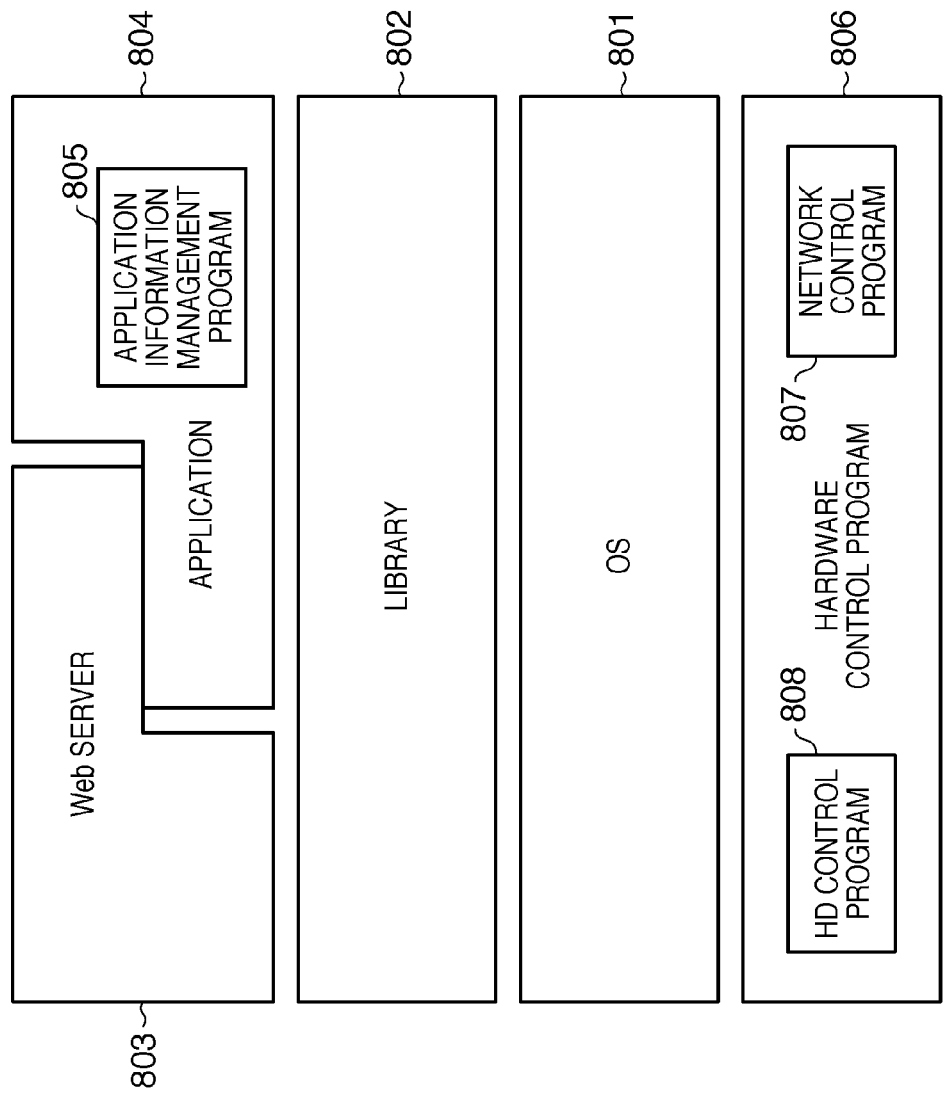

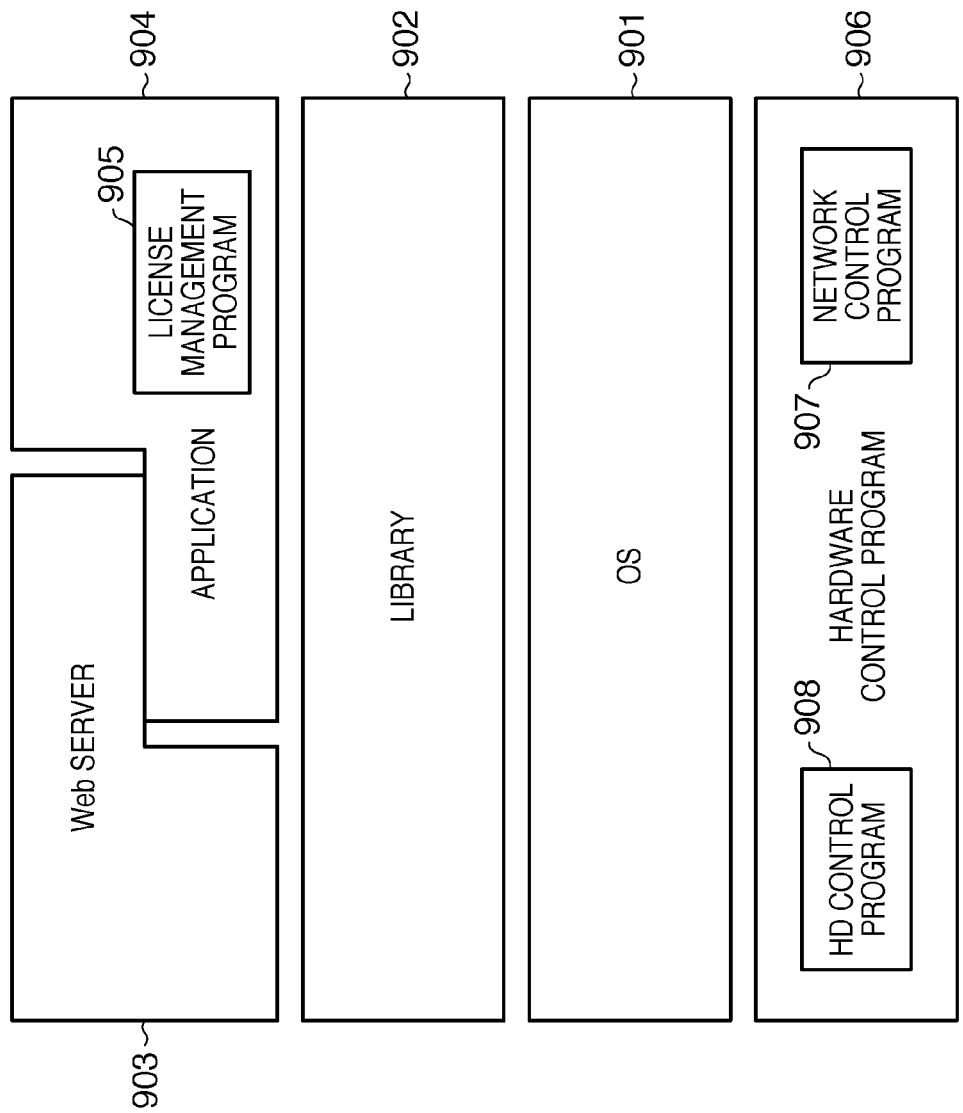

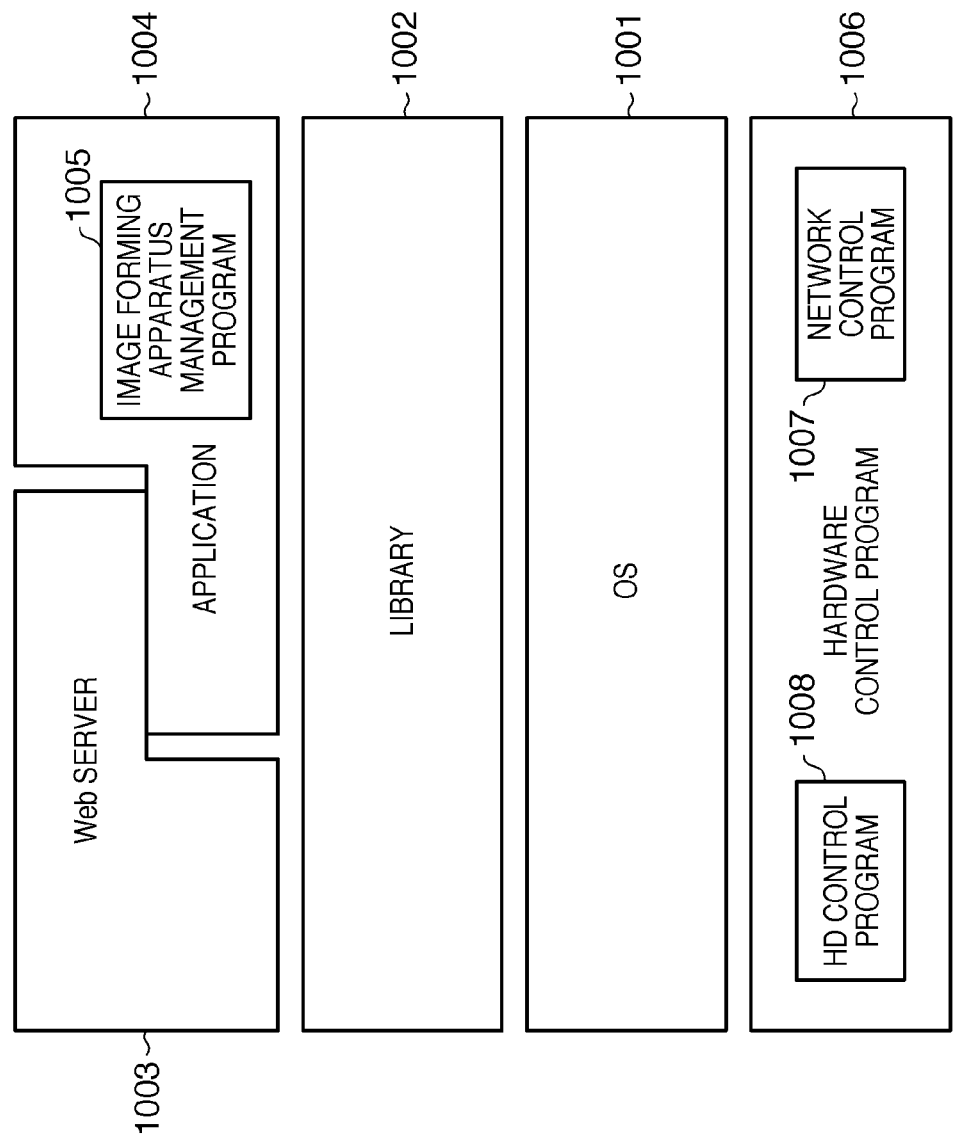

FIG. 11

IMAGE FORMING APPARATUS FUNCTIONS THAT CAN BE ADDED (1100)

| DEVICE NO. \ FUNCTION | Scan | BW PRINT | Color PRINT | Fax SENDING | Fax RECEIVING | MEMORY Box STORAGE |
|---|---|---|---|---|---|---|
| MLX100200 | ○ | ○ | ○ | ○ | ○ | ○ |
| MXY000001 | ○ | ○ | ○ | – | – | – |
| JKZ20010003 | ○ | ○ | – | ○ | – | – |
| ABC1234501 | – | ○ | ○ | – | – | – |
| CAX0913700 | – | – | – | – | – | ○ |

IMAGE FORMING APPARATUS FUNCTIONS NECESSARY FOR OPERATION (1200)

| APPLICATION \ FUNCTION | CONFIGURATION | Scan | BW PRINT | COLOR PRINT | FAX SENDING | FAX RECEIVING | MEMORY BOX STORAGE | Remote Scan | Remote Fax |
|---|---|---|---|---|---|---|---|---|---|
| ScanToOffice | 1 | ○ | – | – | – | – | – | – | – |
| ScanToOffice | 2 | – | – | – | – | – | ○ | ○ | – |
| FaxToOffice | 1 | – | – | – | – | ○ | – | – | – |
| FaxToOffice | 2 | – | – | – | – | – | ○ | – | ○ |

1201　1202　1203　1204　1205　1206　1207　1208　1209　1210

F I G. 13

1300

| IMAGE FORMING APPARATUS \ FUNCTION | Scan | BW PRINT | Color PRINT | Fax SENDING | Fax RECEIV- ING | MEMORY Box STORAGE |
|---|---|---|---|---|---|---|
| 103 | ○ | ○ | ○ | ○ | ○ | ○ |
| 104 | ○ | ○ | ○ | — | — | — |
| 105 | ○ | ○ | — | — | — | — |
| 106 | — | ○ | ○ | — | — | — |
| 107 | ○ | — | — | — | — | — |

1301 1302 1303 1304 1305 1306 1307

F I G. 14

1400

IMAGE FORMING APPARATUSES IMPLEMENTING FUNCTIONS

| VIRTUAL DEVICE \ FUNCTION | Scan | BW PRINT | Color PRINT | Fax SENDING | Fax RECEIV- ING | MEMORY Box STORAGE |
|---|---|---|---|---|---|---|
| VD1 | 104 | — | — | 103 | — | — |
| VD2 | — | 106 | — | — | 103 | — |
| VD3 | 103 | — | 104 | — | — | — |
| VD4 | 103 | — | 106 | — | — | — |
| VD5 | 105 | — | — | — | — | 103 |
| VD6 | 107 | — | — | — | — | 103 |

1401 1402 1403 1404 1405 1406 1407

F I G. 25

INSTALLATION METHOD SELECTION  2500

2501 — APPLICATION NAME : FaxToOffice
2502 — SELECTED VIRTUAL DEVICE : VD1

⦿ CONDITIONAL INSTALLATION
2503 — INSTALLATION DESTINATION IMAGE FORMING APPARATUS : 103
2504 — CONDITION 1 : USE FAX RECEIVING FUNCTION OF 103

OK — 2505

IMAGE FORMATION SYSTEM AND APPLICATION PROGRAM INSTALLATION METHOD

BACKGROUND OF THE INVENTION

1. Field of the Invention

The present invention relates to an image formation system in which a plurality of image forming apparatuses operates cooperatively as a single virtual device and also to installation of an application program.

2. Description of the Related Art

With respect to image forming apparatuses that are configured to enable installation of an application program, it is necessary not to perform installation of an application program to an image forming apparatus that does not have a function that is necessary for the application program to operate.

For example, the following technology is disclosed in Japanese Patent Laid-Open No. 2004-129246. Prior to actually installing an application program, an image forming apparatus acquires information regarding the application operations such as the necessary resources from the application and determines whether or not the image forming apparatus has the resources that are necessary for the application to operate normally. If the determined result shows that the image forming apparatus does not have the necessary resources the image forming apparatus cancels the installation process.

However, technology exists whereby a plurality of image forming apparatuses operates cooperatively as a single image forming apparatus to implement facsimile and remote copy functions by assigning an image forming apparatus to each function on a network. In this kind of environment in which image forming apparatuses operate cooperatively it is inadequate to merely check whether or not the functions of an image forming apparatus that is designated as the installation destination are sufficient for an application program to operate.

SUMMARY OF THE INVENTION

An object of the present invention is to effectively utilize the functions of image forming apparatuses that comprise a virtual device.

According to one aspect of the present invention, there is provided an image formation system in which a plurality of image forming apparatuses operates cooperatively as a single virtual device, comprising:

a managing unit that manages functions of a plurality of image forming apparatuses comprising the virtual device;

a unit that accepts an instruction that designates an application program to be installed and an apparatus that is an installation destination of the application program;

a determining unit that determines whether or not the application program to be installed operates on the apparatus that is the installation destination based on the functions that are managed by the managing unit; and a selecting unit that, according to a result of the determination, displays an apparatus as an installation destination for installing the application program and an installation method, to allow a user to select the apparatus as the installation destination and the installation method.

According to another aspect of the present invention, there is provided a method of installing an application program that is executed by an image formation system in which a plurality of image forming apparatuses operates cooperatively as a single virtual device, comprising the steps of:

managing functions of a plurality of image forming apparatuses comprising the virtual device;

accepting an instruction that designates an application program to be installed and an apparatus that is an installation destination of the application program;

determining whether or not the application program to be installed operates on the apparatus that is the installation destination based on the functions that are managed; and according to a result of the determination, displaying an apparatus as an installation destination for installing the application program and an installation method to allow a user to select the apparatus as the installation destination and the installation method.

Further features of the present invention will become apparent from the following description of exemplary embodiments with reference to the attached drawings.

BRIEF DESCRIPTION OF THE DRAWINGS

FIG. 7 is a view that illustrates an example of the configuration of a virtual device that a plurality of image forming apparatuses operates cooperatively;

FIG. 8 is a block diagram that illustrates an example of the software configuration of the application delivery server 101;

FIG. 9 is a block diagram that illustrates an example of the software configuration of the license management server 102;

FIG. 10 is a block diagram that illustrates an example of the software configuration of the image forming apparatus management server 108;

FIG. 11 is a view that illustrates an example of information that is held by the license management server 102;

FIG. 12 is a view that illustrates an example of information that is held by the application delivery server 101;

FIG. 13 is a view that illustrates an example of information that is held by the image forming apparatus management server 108 in a HDD 408;

FIG. 14 is a view that illustrates an example of information that is held by the image forming apparatus management server 108 in a HDD 408;

FIG. 25 is a view that illustrates an example of an installation method selection operation screen that is sent from the image forming apparatus management server 108 to the PC 112.

DESCRIPTION OF THE EMBODIMENTS

Figure 1:
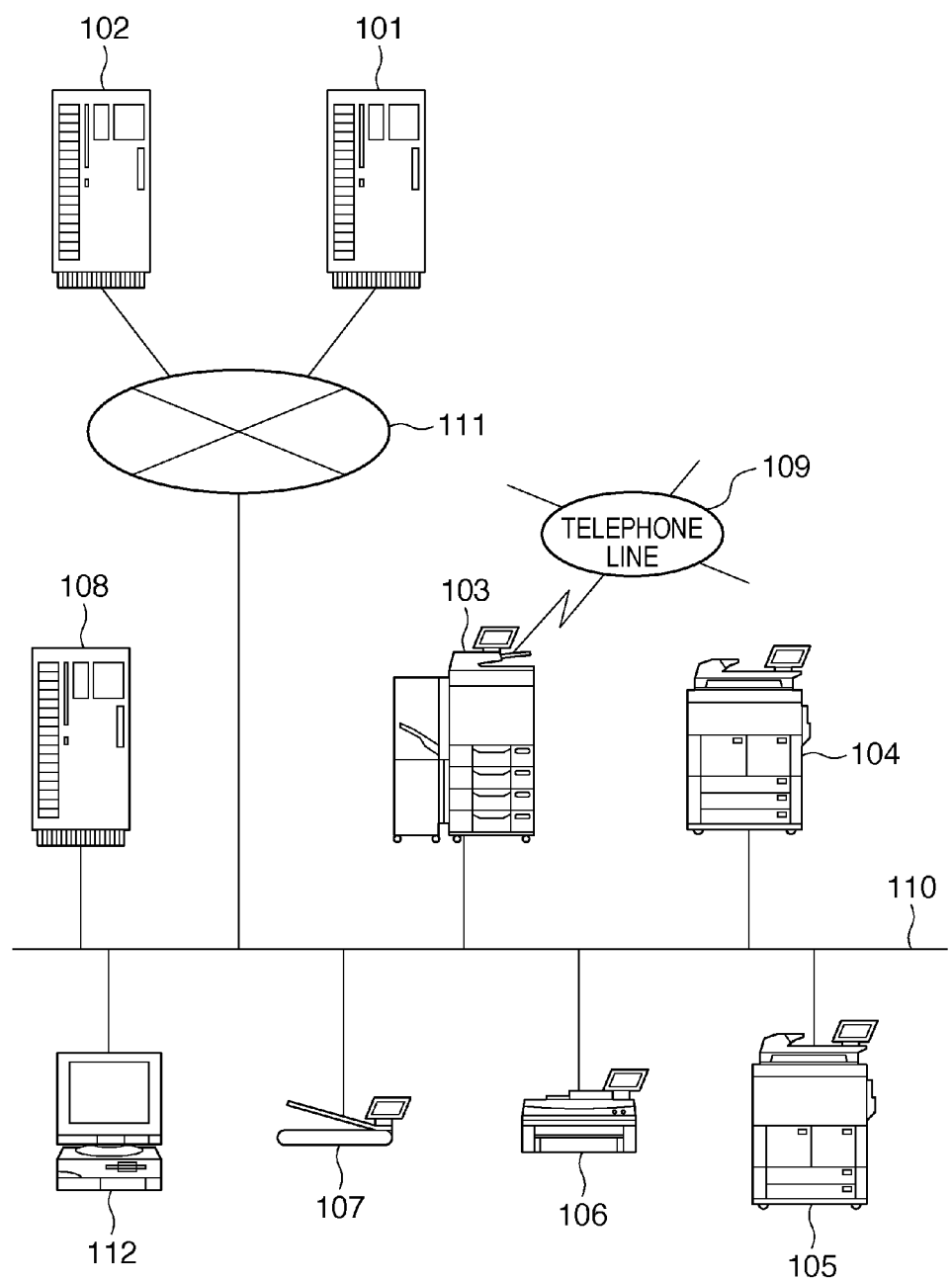
FIG. 1 is a view that illustrates one example of the configuration of an image formation system including image forming apparatuses according to the embodiments.

Hereunder, a best mode for implementing the invention is described in detail while referring to the drawings.

[System Configuration]

FIG. 1 is a view that illustrates an example of the configuration of an image formation system including image forming apparatuses according to the present embodiment. In the environment shown in FIG. 1, an application delivery server 101 fulfills a role of holding and delivering application programs that are installable in the image forming apparatuses. Further, a license management server 102 fulfills a role of issuing licenses for application programs that are held by the application delivery server 101 and licenses for additional functions of the image forming apparatuses. In this case, the application delivery server 101 and the license management server 102 are connectable to the Internet 111. Hereafter, an application program is referred to simply as an "application".

A server 108 fulfills a role of an image forming apparatus management device. An image forming apparatus management program relating to the present invention operates on the server 108. Hereunder, the server 108 is referred to as "image forming apparatus management server 108".

The image forming apparatus management server 108 manages a plurality of image forming apparatuses 103 to 107 that are the objects of management. An image forming apparatus 103 is a central multi-function peripheral in which copying, printing, and scanner functions and facsimile functions are provided in an integrated manner, and which fulfills a multifaceted role. In this case, the image forming apparatus 103 comprises a color scanner and a black and white high-speed copier, and is connected to a telephone line 109 to enable sending and receiving of facsimiles. An image forming apparatus 104 is a color multi-function peripheral comprising color copying, printing, and color scanner functions. An image forming apparatus 105 is a black and white multi-function peripheral that comprises black and white copying and printing functions and a black and white scanner function. An image forming apparatus 106 is a color printer that receives data from an information processing apparatus such as a personal computer (PC) to perform color printing. An image forming apparatus 107 is a color scanner.

Hereunder, the image forming apparatuses 103 to 107 are referred to as "central multi-function peripheral 103", "color multi-function peripheral 104", "black and white multi-function peripheral 105", "color printer 106", and "color scanner 107".

A PC 112 receives scanned image data from and sends image data for printing to the central multi-function peripheral 103, the color multi-function peripheral 104, the black and white multi-function peripheral 105, the color printer 106, and the color scanner 107 directly or via the image forming apparatus management server 108.

As shown in FIG. 1, the image forming apparatus management server 108, central multi-function peripheral 103, color multi-function peripheral 104, black and white multi-function peripheral 105, color printer 106, color scanner 107, and PC 112 are connected to a network 110. These devices are configured so as to be capable of sending and receiving (only either sending or receiving is possible in some cases) data to and from each other. The network 110 is also referred to as an "intranet" with respect to the Internet 111.

In this connection, a configuration may also be adopted in which these devices are present on a separate network that is connected via the Internet 111, and not on the same network 110.

[Hardware Configuration]

Figure 2:
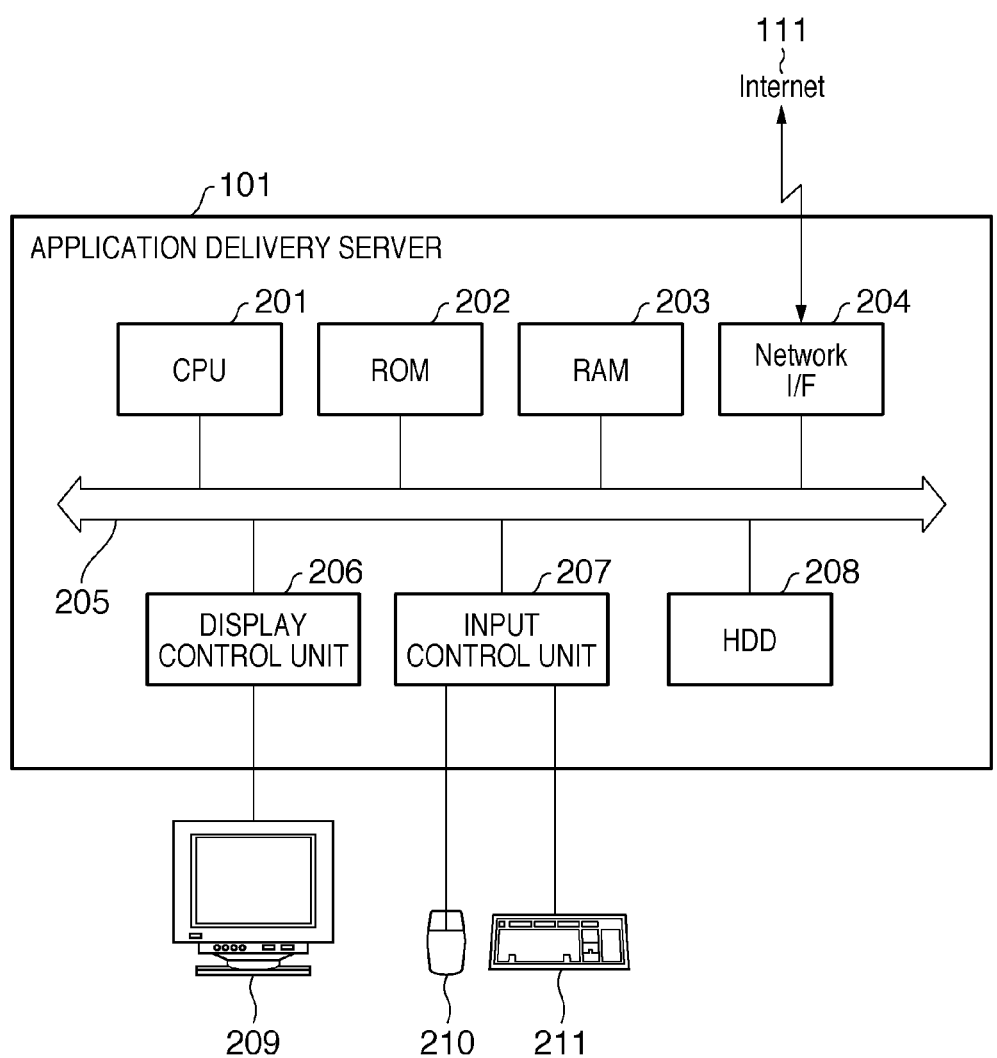
FIG. 2 is a view that illustrates an example of the hardware configuration of an application delivery server 101.

FIG. 2 is a view that illustrates an example of the hardware configuration of the application delivery server 101. The respective components are described below.

A CPU 201 is a device for controlling the entire application delivery server 101. A ROM 202 is a read only memory for storing programs that are executed by the application delivery server and a boot program that is necessary at system startup. A RAM 203 is a work memory that is used when the CPU 201 executes a program. A network I/F unit 204 is a device for performing communication via the Internet 111 with the license management server 102 or the image forming apparatus management server 108 at the hub of the image formation system.

A display control unit 206 is connected with a display device 209. An input control unit 207 is connected with input devices 210 and 211 such as a mouse and a keyboard. An operator that manages the application delivery server 101 checks the operating state of the application delivery server 101 and inputs operation instructions through these input/output devices. Programs that are executed by the CPU 201 or application information or the like are stored in a HDD 208.

The CPU 201 to RAM 203, the display control unit 206, the input control unit 207, and the HDD 208 are connected to a system bus 205.

Figure 3:
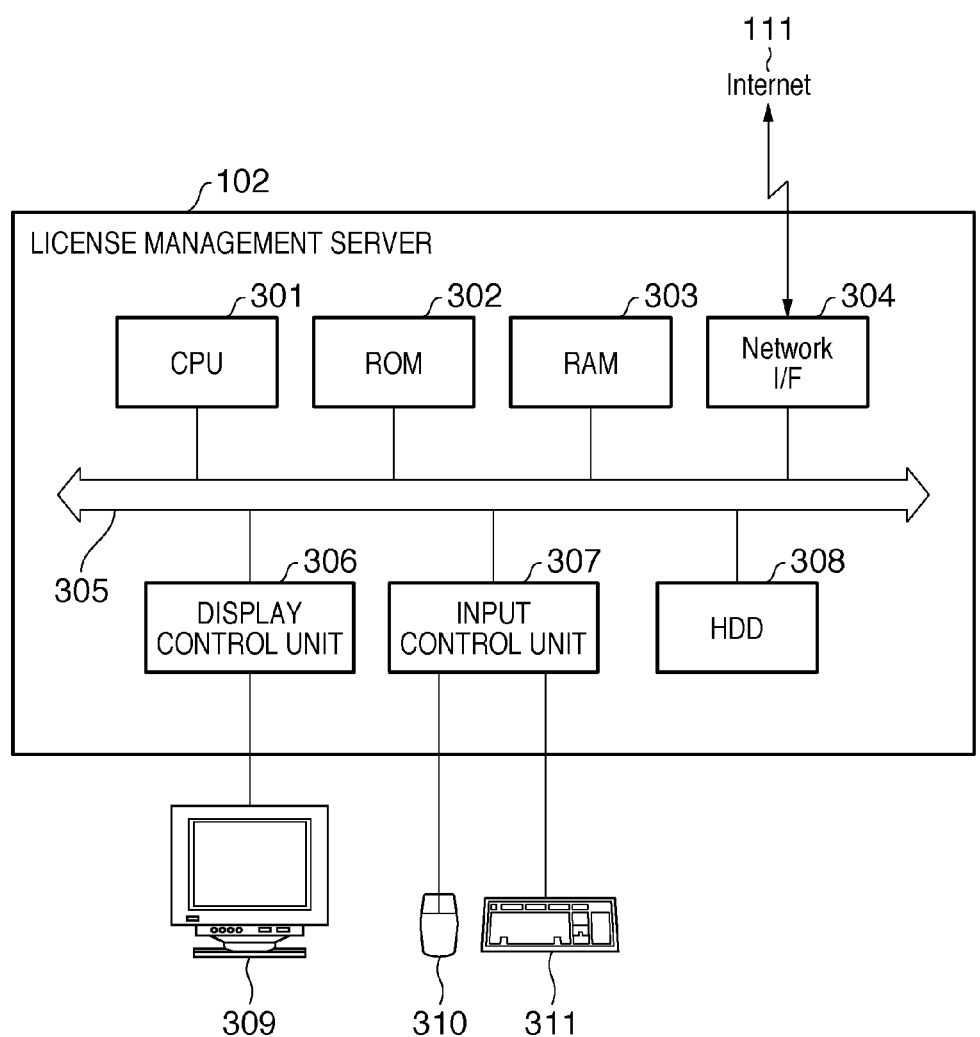
FIG. 3 is a view that illustrates an example of the hardware configuration of a license management server 102.

FIG. 3 is a view that illustrates an example of the hardware configuration of the license management server 102. The respective components are described below.

A CPU 301 is a device for performing overall control of the license management server 102. A ROM 302 is a read only memory for storing programs that are executed by the license management server and a boot program that is necessary at system startup. A RAM 303 is a work memory that is used when the CPU 301 executes a program. A network I/F unit 304 is a device for performing communication via the Internet 111 with the application delivery server 101 or the image forming apparatus management server 108 at the hub of the image formation system.

A display control unit 306 is connected with a display device 309. An input control unit 307 is connected with input devices 310 and 311 such as a mouse and a keyboard. An operator that manages the license management server 102 checks the operating state of the license management server 102 and inputs operation instructions through these input/output devices. Programs that are executed by the CPU 301 or application information or the like are stored in a HDD 308.

The CPU 301 to RAM 303, the display control unit 306, the input control unit 307, and the HDD 308 are connected to a system bus 305.

Figure 4:
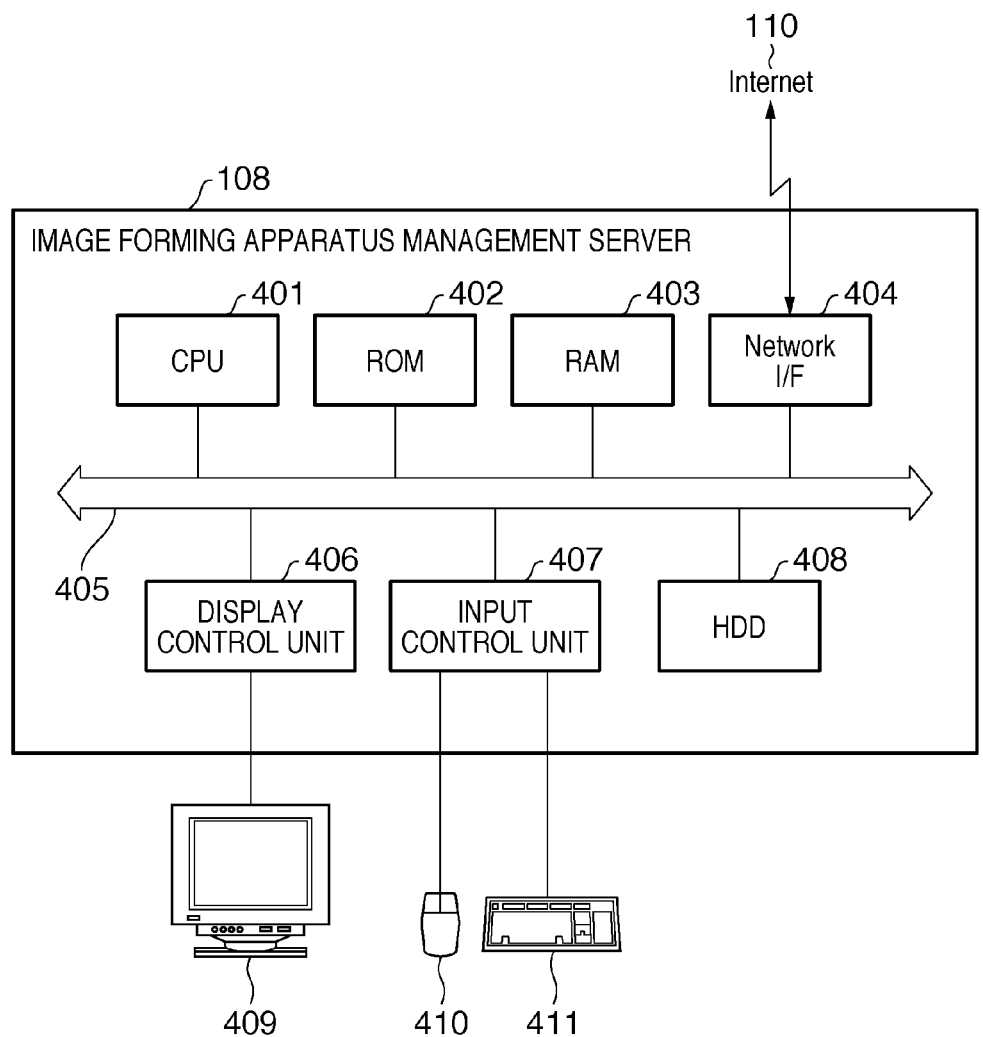
FIG. 4 is a view that illustrates an example of the hardware configuration of an image forming apparatus management server 108.

FIG. 4 is a view that illustrates an example of the hardware configuration of the image forming apparatus management server 108. The respective components are described below.

A CPU 401 is a device for performing overall control of the image forming apparatus management server 108. A ROM 402 is a read only memory for storing programs that are executed by the image forming apparatus management server and a boot program that is necessary at system startup. A RAM 403 is a work memory that is used when the CPU 401 executes a program. A network I/F unit 404 is a device for performing communication via the intranet 110 with the central multi-function peripheral 103 at the center of the image formation system, the color multi-function peripheral 104, the black and white multi-function peripheral 105, the color printer 106, the color scanner 107, and the PC 112.

A display control unit 406 is connected with a display device 409. An input control unit 407 is connected with input devices 410 and 411 such as a mouse and a keyboard. An operator that manages the image forming apparatus management server 108 checks the operating state of the image forming apparatus management server 108 and inputs operation instructions through these input/output devices. Programs that are executed by the CPU 401 or application information or the like are stored in a HDD 408.

The application delivery server 101 or license management server 102 that is connected to the Internet 111 performs communication through the Internet 111 via a proxy server or the like from the intranet 110.

The CPU 401 to RAM 403, the display control unit 406, the input control unit 407, and the HDD 408 are connected to a system bus 405.

Figure 5:
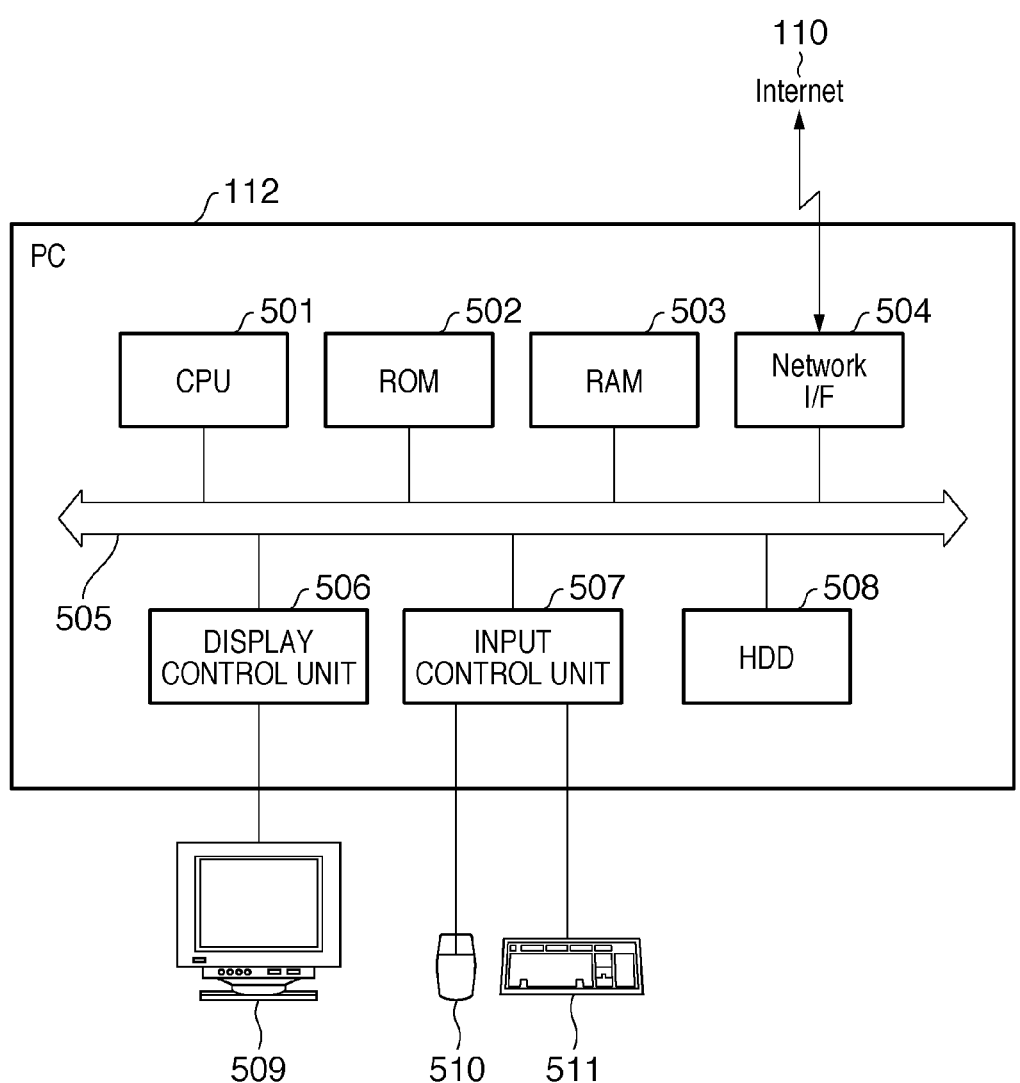
FIG. 5 is a view that illustrates an example of the hardware configuration of a PC 112.

FIG. 5 is a view that illustrates an example of the hardware configuration of the PC 112. The respective components are described below. The PC 112 is also referred to as a "client PC" of the above described server.

A CPU 501 is a device for performing overall control of the PC 112. A ROM 502 is a read only memory for storing programs that are executed by the PC 112 and a boot program that is necessary at system startup. A RAM 503 is a work memory that is used when the CPU 501 executes a program. A network I/F unit 504 is a device for performing communication via the intranet 110 with the image forming apparatus management server 108 or the central multi-function peripheral 103 at the center of the image formation system, the color multi-function peripheral 104, the black and white multi-function peripheral 105, the color printer 106, and the color scanner 107.

A display control unit 506 is connected with a display device 509. An input control unit 507 is connected with input devices 510 and 511 such as a mouse and a keyboard. A user of the PC 112 enters operation instructions for the image forming apparatus management server 108 or the central multi-function peripheral 103, the color multi-function peripheral 104, the black and white multi-function peripheral 105, the color printer 106, and the color scanner 107 through these input/output devices. Programs that are executed by the CPU 501 or application information or the like are stored in a HDD 508.

The CPU 501 to 503, the display control unit 506, the input control unit 507, and the HDD 508 are connected to a system bus 505.

Figure 6:
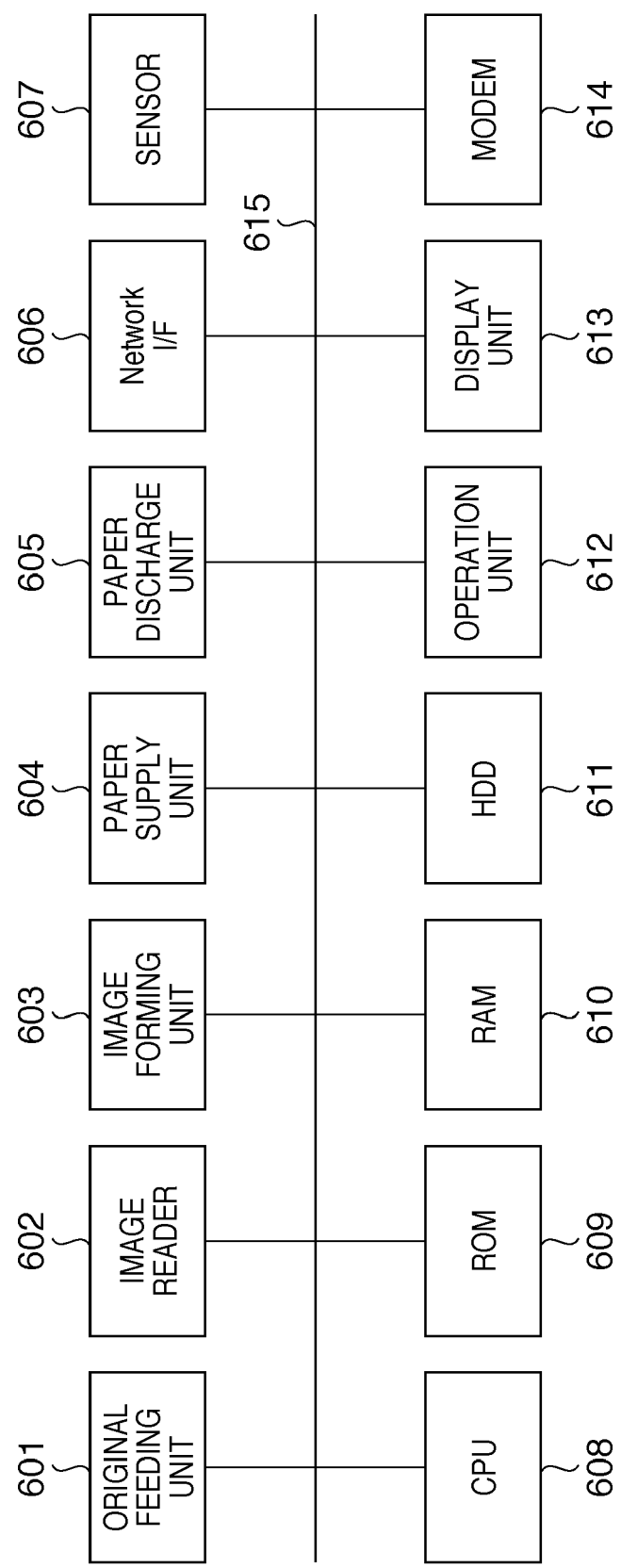
FIG. 6 is a view that illustrates an example of the hardware configuration of a central multi-function peripheral 103.

FIG. 6 is a view that illustrates an example of the hardware configuration of the central multi-function peripheral 103. As shown in FIG. 6, the central multi-function peripheral 103 comprises the respective units 601 to 614.

An original feeding unit 601 automatically sends an original to be read to an image reader (scanner) 602. The scanner 602 optically scans an original and to perform conversion to electrical signals and output the resulting data. An image forming unit 603 converts data of a scanned original or received data to a print image and performs printing thereof. A paper supply unit 604 supplies paper for printing. A paper discharge unit 605 discharges a printed paper and performs processing such as sorting and stapling.

A network I/F 606 is connected to a LAN and the Internet via a network and exchanges information with the outside. A sensor 607 detects the operating state of each unit of the central multi-function peripheral 103. A CPU 608 controls each process of the central multi-function peripheral 103. A ROM 609 stores data or programs relating to each process of the central multi-function peripheral 103. A RAM 610 electrically stores temporary data relating to each process of the central multi-function peripheral 103.

A HDD 611 stores programs or data relating to each process of the central multi-function peripheral 103 as well as temporary data and user data that is sent thereto and the like. An operation unit 612 accepts input of instructions to the central multi-function peripheral 103. A display unit 613 displays information relating to the operating status of the central multi-function peripheral 103 or operations with respect to the operation unit 612. A modem 614 is connected to a telephone line and receives and sends facsimiles. A system bus 615 links each of the units 601 to 614 to allow the exchange of data.

In the central multi-function peripheral 103, of the units shown in FIG. 6, the image reader 602 performs color scanning and the image forming unit 603 processes data as black and white data. Further, a program stored in the HDD 611 converts print data to PDF data. The central multi-function peripheral 103 also comprises a function (memory box storage function) that stores files created by the PDF-conversion program in a hierarchical structure inside the HDD 611.

The hardware configuration of the color multi-function peripheral 104 is the same as the configuration shown in FIG. 6, except that the modem 614 is omitted. Furthermore, in the color multi-function peripheral 104, the image reader 602 and the image forming unit 603 support color data.

The hardware configuration of the black and white multi-function peripheral 105 is the same as the configuration shown in FIG. 6, except that the modem 614 is omitted. Furthermore, in the black and white multi-function peripheral 105, the image reader 602 and the image forming unit 603 only support black and white data.

The hardware configuration of the color printer 106 is the same as the configuration shown in FIG. 6, except that the original feeding unit 601, the image reader 602, and the modem 614 are omitted. In the color printer 106, the image reader 602 and image forming unit 603 support color data.

The hardware configuration of the color scanner 107 is the same as the configuration shown in FIG. 6, except that the original feeding unit 601, the paper supply unit 604, the paper discharge unit 605, the HDD 611 and the modem 614 are omitted. In the color scanner 107, the image reader 602 and image forming unit 603 support color data.

[Virtual Device]

In the environment shown in FIG. 1, the functions of the above described central multi-function peripheral 103, color multi-function peripheral 104, black and white multi-function peripheral 105, color printer 106, and color scanner 107 are cooperated with each other to perform a single process. An environment in which a plurality of image forming apparatuses operates cooperatively as a single image forming apparatus is referred to as a "virtual device".

FIG. 7 is a view that illustrates an example of the configuration of a virtual device in which a plurality of image forming apparatuses is cooperated with each other. In FIG. 7, reference numerals 103 to 107 denote the same image forming apparatuses as the reference numerals that denote the image forming apparatuses shown in FIG. 1.

Reference numeral 701 denotes an example of a virtual device that functions as a cooperative facsimile device that performs sending and receiving of facsimiles. By linking the color multi-function peripheral 104 with the central multi-function peripheral 103, as denoted by reference numeral 704, a virtual device VD1 sends an image that is scanned by the color multi-function peripheral 104 using a facsimile function of the central multi-function peripheral 103. Further, by linking the central multi-function peripheral 103 with the color printer 106, as denoted by reference numeral 705, a virtual device VD2 prints a facsimile that is received by the central multi-function peripheral 103 using the color printer 106.

Next, reference numeral 702 denotes an example of a virtual device that functions as a cooperative color copy device that performs color copying. By linking the central multi-function peripheral 103 with the color multi-function peripheral 104, as denoted by reference numeral 706, a virtual device VD3 prints an image that is scanned by the central multi-function peripheral 103 using the color multi-function peripheral 104. Further, by linking the central multi-function peripheral 103 with the color printer 106, as denoted by reference numeral 707, a virtual device VD4 prints an image that is scanned by the central multi-function peripheral 103 with the color printer 106.

Next, reference numeral 703 denotes an example of a virtual device that functions as a cooperative scan-to-box storing device that stores scan data in a "memory box". By linking the black and white multi-function peripheral 105 with the central multi-function peripheral 103, as denoted by reference numeral 708, a virtual device VD5 converts an image that is scanned by the black and white multi-function peripheral 105 into a PDF file using the PDF-conversion program of the central multi-function peripheral 103. The virtual device VD5 then stores the PDF file in the HDD 408 using the memory box storage function of the central multi-function peripheral 103. Further, by linking the color scanner 107 with the central multi-function peripheral 103, as denoted by reference numeral 709, a virtual device VD6 converts an image that is scanned by the color scanner 107 into a PDF file using the PDF-conversion program of the central multi-function peripheral 103. The virtual device VD6 then stores the PDF file in the HDD 408 using the memory box storage function of the central multi-function peripheral 103.

[Software Configuration]

FIG. 8 is a block diagram that illustrates an example of the software configuration of the application delivery server 101. As shown in FIG. 8, the application delivery server 101 includes as software an OS (operating system) 801, a library 802, a Web server 803, and an application 804. The application 804 further includes an application information management program 805 that manages information relating to applications.

The application delivery server 101 includes a hardware control program 806 as basic software. The hardware control program 806 further includes a network board control program 807 and a hard disk control program 808.

FIG. 9 is a block diagram that illustrates an example of the software configuration of the license management server 102. As shown in FIG. 9, the license management server 102 includes as software an OS (operating system) 901, a library 902, a Web server 903, and an application 904. The application 904 further includes a license management program 905 that manages an application license or a license of an additional function of the image forming apparatus.

The license management server 102 includes a hardware control program 906 as basic software. The hardware control program 906 further includes a network board control program 907 and a hard disk control program 908.

FIG. 10 is a block diagram that illustrates an example of the software configuration of the image forming apparatus management server 108. As shown in FIG. 10, the image forming apparatus management server 108 includes as software an OS (operating system) 1001, a library 1002, a Web server 1003, and an application 1004. The application 1004 further includes an image forming apparatus management program 1005.

The image forming apparatus management server 108 includes a hardware control program 1006 as basic software. The hardware control program 1006 further includes a network board control program 1007 and a hard disk control program 1008.

[Information Held by Each Server]

FIG. 11 is a view that illustrates an example of information that is held by the license management server 102. A table 1100 shown in FIG. 11 is information that the license management server 102 holds in the HDD 308. Reference numeral 1101 denotes device numbers that specify image forming apparatuses. Reference numerals 1102 to 1107 denote image forming apparatus functions that can be added to an image forming apparatus that is specified by device number 1101.

Reference numeral 1102 denotes a scan function that reads an image, reference numeral 1103 denotes a black and white print function, reference numeral 1104 denotes a color print function, reference numeral 1105 denotes a facsimile sending function, reference numeral 1106 denotes a facsimile receiving function, and reference numeral 1107 denotes a memory box storage function.

In this connection, the symbol "○" described in the respective functions 1102 to 1107 indicates that the relevant function can be added, while the symbol "–" indicates that the relevant function can not be added.

FIG. 12 is a view that illustrates an example of information that is held by the application delivery server 101. A table 1200 shown in FIG. 12 is information that the application delivery server 101 holds in the HDD 208. Reference numeral 1201 denotes names of applications. Reference numeral 1202 denotes types of image forming apparatus configurations that are necessary to install and run an application. In this case, numeral "1" in the configuration 1202 denotes the optimal function and numeral "2" or higher denotes an alternative configuration. Reference numerals 1203 to 1210 denote image forming apparatus functions that are necessary to install and operate an application.

Although not shown in the figure, the storage location of the application main body (installer) is also stored in the table 1200.

FIG. 13 is a view that illustrates an example of information that is held by the image forming apparatus management server 108 in the HDD 408. A table 1300 shown in FIG. 13 is information that the image forming apparatus management server 108 holds in the HDD 408. Reference numeral 1301 denotes information that uniquely specifies an image forming apparatus, and the numbers match those of the image forming apparatuses shown in FIG. 1. Reference numerals 1302 to 1307 denote functions held by the image forming apparatuses specified by the information 1301.

Reference numeral 1302 denotes a scan function that reads an image, reference numeral 1303 denotes a black and white print function, reference numeral 1304 denotes a color print function, reference numeral 1305 denotes a facsimile sending function, reference numeral 1306 denotes a facsimile receiving function, and reference numeral 1307 denotes a memory box storage function.

FIG. 14 is a view that illustrates an example of information that is held by the image forming apparatus management server 108 in the HDD 408. A table 1400 shown in FIG. 14 corresponds to the configuration of virtual devices shown in FIG. 7. The reference numbers 103 to 107 described in the table 1400 denote the same devices as the reference numbers shown in FIG. 1. This information is created by virtual device creation processing by the user on the image forming apparatus management server 108, and is stored in the HDD 408.

In this connection, the information in table 1400 may be created by the image forming apparatus management server 108 appropriately combining image forming apparatuses that the image forming apparatus management server 108 finds on the network 110 to automatically configure a virtual device.

Reference numeral 1401 denotes virtual devices. Reference numerals 1402 to 1407 denote the functions of the virtual devices listed in 1401. The numbers 103 to 107 denote the image forming apparatuses that implement the relevant function.

Reference numeral 1402 denotes a scan function that reads an image, reference numeral 1403 denotes a black and white print function, reference numeral 1404 denotes a color print function, reference numeral 1405 denotes a facsimile sending function, reference numeral 1406 denotes a facsimile receiving function, and reference numeral 1407 denotes a memory box storage function.

In this case, the virtual device number VD1 denotes that the color multi-function peripheral 104 is responsible for the scan function and the central multi-function peripheral 103 is responsible for facsimile reception. The virtual device number VD2 denotes that the color printer 106 is responsible for black and white printing (since this is facsimile printing of black and white data, the black and white printing function is allocated thereto) and the central multi-function peripheral 103 is responsible for facsimile reception.

The virtual device number VD3 denotes that the central multi-function peripheral 103 is responsible for the scan function and the color multi-function peripheral 104 is responsible for color printing. Further, the virtual device number VD4 denotes that the central multi-function peripheral 103 is responsible for the scan function and the printer 106 is responsible for color printing.

Further, the virtual device number VD5 denotes that the black and white multi-function peripheral 105 is responsible for the scan function and the central multi-function peripheral 103 is responsible for memory box storage. Furthermore, the virtual device number VD6 denotes that the scanner 107 is responsible for the scan function and the central multi-function peripheral 103 is responsible for memory box storage.

The cooperative operations of the application delivery server 101, the license management server 102, the image forming apparatus management server 108, and the PC 112 relating to purchase of an application license according to the above configuration are now described.

Figure 15:
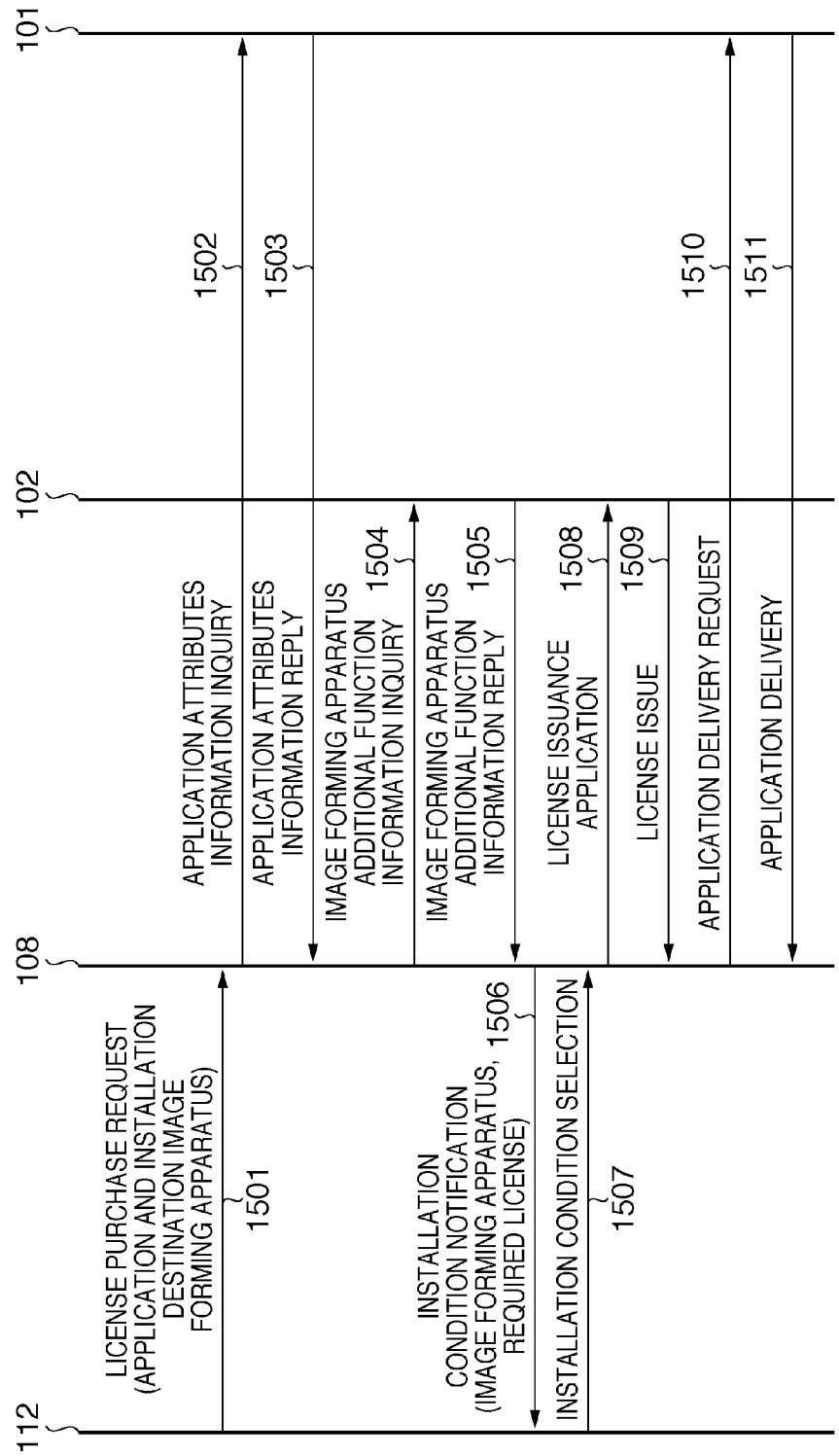
FIG. 15 is a view that illustrates a sequence relating to purchase of an application license.

FIG. 15 is a view that illustrates a sequence relating to purchase of an application license. First, a user of the PC 112 specifies information that designates an image forming apparatus and an application as an installation object, and notifies an application license purchase request to the image forming apparatus management server 108 (1501). The image forming apparatus management server 108 sends an inquiry to the application delivery server 101 regarding the image forming apparatus functions that are necessary for the notified application to operate (1502). The application delivery server 101 searches the table 1200 that is stored in the HDD 208 through the application information management program 805. More specifically, the application delivery server 101 searches the table 1200 with the application name 1201 of the relevant application and notifies the function of at least one image forming apparatus that is required for the operation to the image forming apparatus management server 108 (1503).

By means of this notification the image forming apparatus management server 108 searches the tables 1300 and 1400 that are stored in the HDD 408 through the image forming apparatus management program 1005 based on the response from the application delivery server 101. More specifically, the image forming apparatus management server 108 determines if an image forming apparatus having the function of the image forming apparatus that is notified by the application delivery server 101 is present among the image forming apparatuses 1301 in table 1300 or is present among the virtual devices 1401 in table 1400. When the determined result is that an image forming apparatus having the relevant function is not present, the image forming apparatus management server 108 sends an inquiry for additional function information to the license management server 102 (1504).

In response to the inquiry, the license management server 102 searches the table 1100 stored in the HDD 508 through the license management program 905, and notifies the additional function information to the image forming apparatus management server 108 (1505). Based on this notification, the image forming apparatus management server 108 notifies installation destination devices and installation methods to the PC 112 (1506). In this connection, the installation destination devices and installation methods are determined by the image forming apparatus management program 905 performing operations that are described in detail later.

The user of the PC 112 selects an appropriate method among the installation methods that are notified by the image forming apparatus management server 108, and notifies the image forming apparatus management server 108 (1507). Upon receiving the notification, the image forming apparatus management server 108 requests the license management server 102 to issue the necessary license for the installation method that is selected at the PC 112 (1508). The license management server 102 searches the license information that is stored in the HDD 308 through the license management program 905, and notifies the license that is necessary for installing an additional function or application to the image forming apparatus management server 108 (1509).

In this case, the image forming apparatus management server 108 sends an application delivery request to the application delivery server 101 (1510). The application delivery server 101 retrieves application information that is stored in the HDD 208 through the application information management program 805, and delivers the application that is requested by the image forming apparatus management server 108 (1511).

Figure 16:
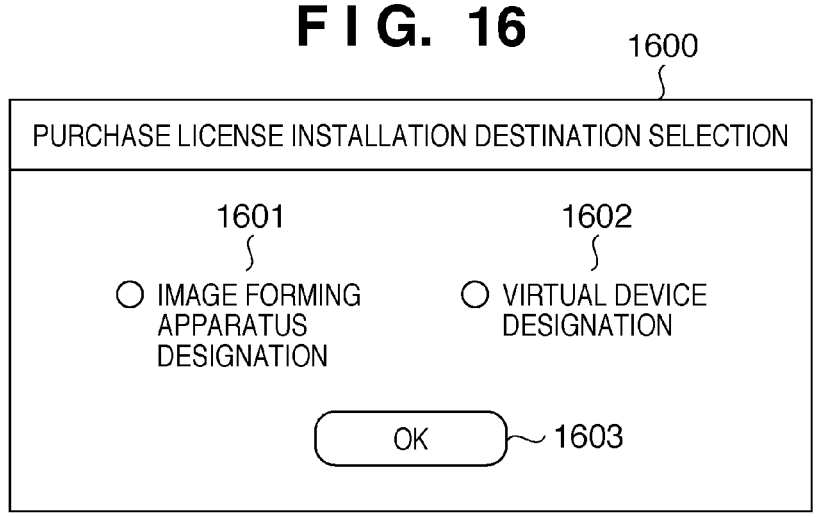
FIG. 16 is a view that illustrates an example of an operation screen for making an application license purchase request.

FIG. 16 is a view that illustrates an example of an operation screen for making an application license purchase request. A screen 1600 is a screen that allows a user to select whether the installation destination is a stand-alone image forming apparatus or a virtual device before the PC 112 notifies a license purchase request to the image forming apparatus management server 108. Designation of the apparatus type selections 1601 and 1602 and the OK button 1603 is performed using input devices 510 and 511.

Figure 17:
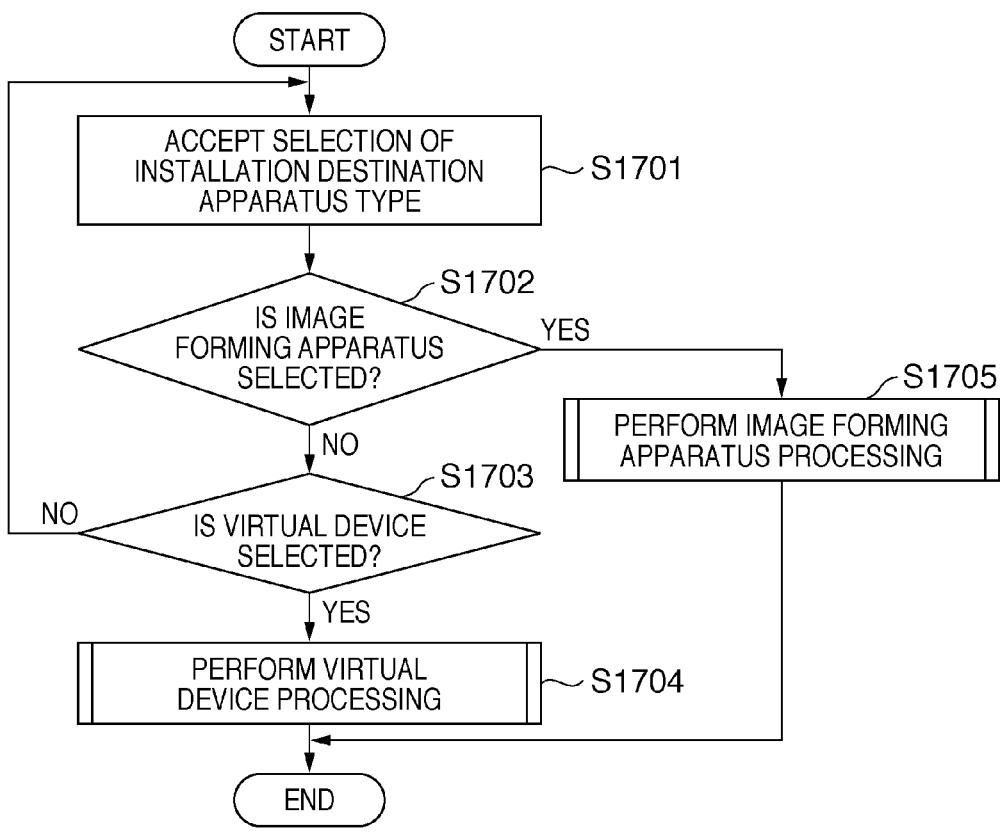
FIG. 17 is a flowchart that illustrates operations performed when selecting the installation destination apparatus type with an image forming apparatus management program 1005 of the image forming apparatus management server 108.

FIG. 17 is a flowchart that illustrates operations performed when selecting the installation destination apparatus type with the image forming apparatus management program 1005 of the image forming apparatus management server 108. In step S1701, the operation screen 1600 is displayed to accept selection of the type of apparatus at the installation destination. In step S1702, when OK 1603 is designated, it is determined whether the apparatus selected as the installation destination is an image forming apparatus. If the determined result is that an image forming apparatus designation 1601 is selected, the operation advances to step S1705 to execute image forming apparatus processing that is described in detail later.

In contrast, if the result determined in the above-described step S1702 is that the image forming apparatus designation 1601 is not selected, the operation advances to step S1703 to determine if a virtual device is selected as the installation destination. If the determined result is that the virtual device designation 1602 is not selected, the operation returns to the above-described step S1701. If the determined result is that the virtual device designation 1602 is selected, the operation advances to step S1704 to execute virtual device processing that is described in detail later.

Figure 18:
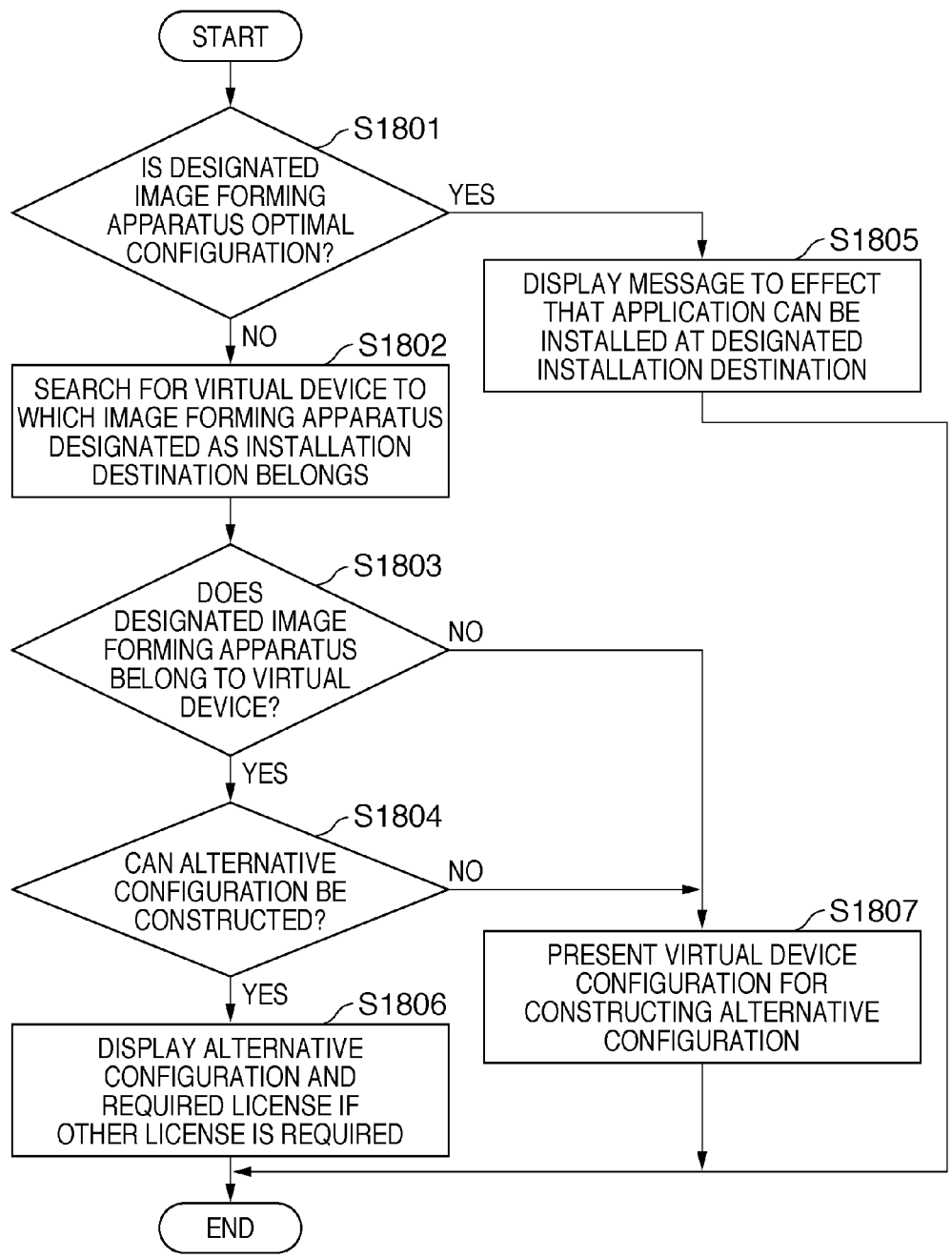
FIG. 18 is a flowchart that illustrates processing performed in S1705 shown in FIG. 17.
Figure 19:
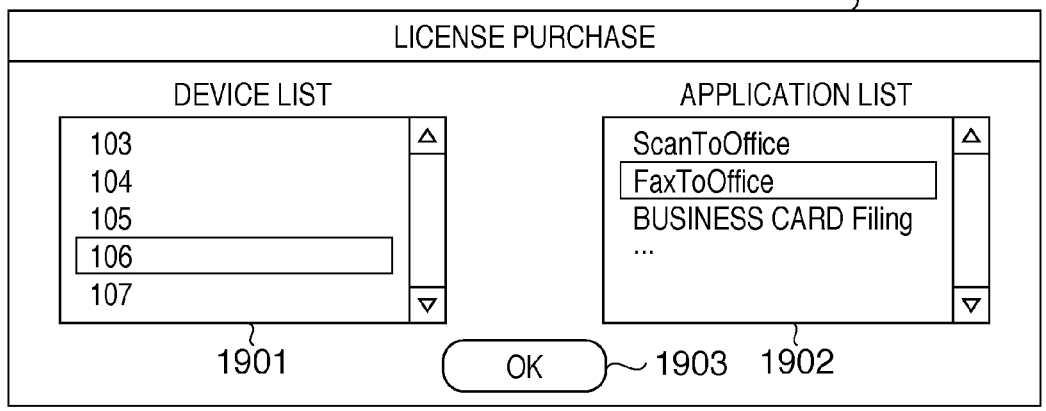
FIG. 19 is a view that illustrates an example of an operation screen that is displayed when making an application license purchase request.

FIG. 18 is a flowchart that illustrates the processing performed in S1705 shown in FIG. 17. In step S1801, an operation screen is displayed that appears when making a request to purchase an application license as shown in FIG. 19. This operation screen 1900 is received by the image forming apparatus management server 108 via the network 110, and is displayed on the display device 509.

In FIG. 19, reference numeral 1901 denotes a list of installation destination devices. This list 1901 corresponds to the information 1301 with which the image forming apparatus management server 108 specifies an image forming apparatus in the table 1300 held in the HDD 208. Reference numeral 1902 denotes a list of applications that are available to install. Reference numeral 1903 denotes an OK button. When the operator depresses the OK button 1903, the information that is selected on the operation screen 1900 is notified to the image forming apparatus management server 108 via the network 110.

In this step S1801, it is determined whether or not an image forming apparatus that is selected as an installation destination using the operation screen 1900 is optimal as the installation destination of the application that is selected in the same way. In this case, an example is described in which the image forming apparatus 106 is selected, and "FaxToOffice" in the table 1200 is selected as the application. "FaxToOffice" is an application that analyzes received facsimile data using OCR (character recognition according to an optical technique), and thereafter performs processing to extract information such as the destination and sender. The image forming apparatus configurations required for the "FaxToOffice" application to operate are of two kinds. The first configuration is a facsimile receiving function. The second configuration is a "RemoteFax" function and a "Memory Box Storage" function.

In this step S1801, first the image forming apparatus management server 108 sends an inquiry to the application delivery server 101 regarding the image forming apparatus functions that are required to install the selected application. Two kinds of functional configurations are defined with respect to the functional configuration that is necessary to install the "FaxToOffice" application. The application delivery server 101 sends a reply to the effect that there are two configurations to the image forming apparatus management server 108. The first configuration represents the optimal configuration. The second and subsequent configurations represent alternative configurations for a case where the selected image forming apparatus does not have the optimal configuration. A facsimile receiving function 1207 is notified as the first configuration, and a memory box storage function 1208 and a remote fax function 1210 are notified as the second configuration from the application delivery server 101 to the image forming apparatus management server 108.

Next, the image forming apparatus management server 108 retrieves the functions of the selected image forming apparatus from the table 1200 and compares those functions with the necessary image forming apparatus function(s) notified by the application delivery server 101. If the image forming apparatus management server 108 determines as the result of the comparison that the selected image forming apparatus has the necessary function(s), the image forming apparatus management server 108 executes step S1805. If it is determined that the selected image forming apparatus does not have the necessary function(s), the image forming apparatus management server 108 executes the processing of step S1802 onwards.

In this case, since, based on the table 1300 shown in FIG. 13, the image forming apparatus 106 that is selected does not have the facsimile receiving function 1306, the image forming apparatus management server 108 executes the processing of step S1802 onwards. In this connection, if the image forming apparatus 103 were selected, and not the image forming apparatus 106, because the image forming apparatus 103 has a facsimile receiving function of the first configuration for executing the application, the image forming apparatus management server 108 would determine that the selected image forming apparatus has the function necessary to execute the "FaxToOffice" application and would therefore execute step S1805.

In step S1802, the image forming apparatus management server 108 searches for a virtual device that includes the selected image forming apparatus as a component from the table 1400. Next, in step S1803, when the image forming apparatus management server 108 determines that the selected image forming apparatus is a component of a virtual device the image forming apparatus management server 108 executes step S1804. If it is determined in step S1803 that the selected image forming apparatus is not a component of a virtual device, the image forming apparatus management server 108 executes step S1807. In this case, since the selected image forming apparatus 106 is included in two virtual devices VD2 and VD4, step S1804 is executed.

In step S1804, the image forming apparatus management server 108 determines whether the virtual devices retrieved in step S1802 have the image forming apparatus functions necessary for the application acquired in step S1801. In this case, the image forming apparatus management server 108 searches the table 1400 and finds that the virtual device VD2 that includes the image forming apparatus 106 possesses the facsimile receiving function 1406 and therefore determines that the virtual device VD2 possesses the image forming apparatus function necessary for the application.

Further, the image forming apparatus management server 108 determines whether or not there is an image forming apparatus that has the optimal function for operating the application among the image forming apparatuses constituting the virtual device. The image forming apparatus management server 108 searches the table 1400 and determines that the image forming apparatus 103 that is one component of the virtual device VD2 has the optimal configuration for installing the application.

By searching the table 1300, the image forming apparatus management server 108 determines that the selected image forming apparatus 106 has neither the first configuration nor the second configuration for installing the application "FaxToOffice".

The second configuration of a destination for installing the application "FaxToOffice" is a "RemoteFax" and a "Memory Box" function. The virtual device VD2 possesses "RemoteFax" as one function. Therefore, the image forming apparatus management server 108 sends an inquiry to the license management server 102 regarding whether the "memory box" function can be added to the image forming apparatus 106 that includes a notification of the model number CAX0913700 (held in table 1300; not shown) of the image forming apparatus 106.

The license management program 805 of the license management server 102 searches the table 1100 and determines that CAX0913700, that is, the image forming apparatus 106, is capable of adding the memory box storage function 1107. Subsequently, as the reply to the inquiry from the image forming apparatus management server 108, the license management server 102 sends a notification to the effect that the memory box storage function can be added.

Thus, based on the reply from the license management server 102, the image forming apparatus management server 108 determines that the image forming apparatus 106 is capable of installing the application by using an optional addition.

When the image forming apparatus management server 108 determines that the virtual device has the functions necessary for the application to operate, or that it is possible to add the necessary functions, the image forming apparatus management server 108 executes step S1806. When it is determined that the virtual device does not have the necessary functions, the image forming apparatus management server 108 executes step S1807.

When the selected image forming apparatus is the image forming apparatus 106, as described above, since it is determined that the virtual device has the functions necessary for the application to operate, or that the virtual device can have the necessary functions by using an optional purchase, the image forming apparatus management server 108 executes step S1806.

Figure 20:
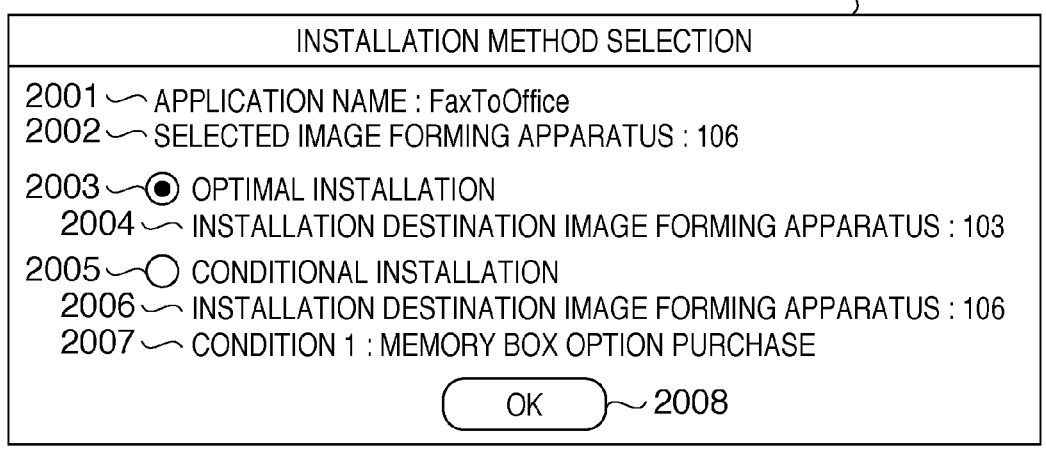
FIG. 20 is a view that illustrates an example of an installation method selection screen.

In step S1806, as the response to a FaxToOffice license purchase request to the image forming apparatus 106 from the PC 112, the image forming apparatus management server 108 displays an installation method selection screen as shown in FIG. 20. In FIG. 20, reference numeral 2001 denotes the name of an application to be installed that is selected at the PC 112. Reference numeral 2002 denotes an image forming apparatus as the installation destination that is selected at the PC 112. Reference numeral 2003 denotes a button that selects the optimal installation. Reference numeral 2004 denotes the optimal image forming apparatus as an installation destination of the application that is displayed with the application name 2001.

Reference numeral 2005 denotes a button that selects conditional installation of the application that is displayed with the application name 2001. This conditional installation is displayed in the following two cases.

(1) A case in which the image forming apparatus that is selected as the installation destination does not have the optimal configuration as an installation destination of the application that is displayed with the application name 2001.

(2) A case in which a virtual device in which the selected image forming apparatus is a constituent apparatus does not have the optimal configuration as an installation destination of the application that is displayed with the application name 2001.

Reference numeral 2006 denotes the image forming apparatus that is the installation destination.

Reference numeral 2007 denotes a condition for the application to operate normally in the image forming apparatus 106 that does not have the optimal configuration. In this example, the condition 2007 indicates that it is necessary for a memory box storage function to be added to the image forming apparatus 106 in order for the application to operate at the selected image forming apparatus.

In the example shown in FIG. 20, since there is an image forming apparatus that has the optimal function for the application to operate in the virtual device, the items 2003 and 2004 are displayed as components of the installation method selection screen 2000. Further, the items 2005 and 2006 are displayed, and information corresponding to the alternative configuration items 2005 to 2007 is shown.

In this case, when the image forming apparatus management server 108 determines that the OK button 2008 is depressed, the image forming apparatus management server 108 performs the following processing in accordance with the selected installation method.

Further, when the optimal installation 2003 is selected, the image forming apparatus management server 108 requests the license management server 102 to issue an application license. When the conditional installation 2005 is selected, in addition to the processing when the optimal installation 2003 is selected, the image forming apparatus management server 108 requests the license management server 102 to issue a license for the memory box storage function.

Step S1805 is executed when the image forming apparatus that is selected as the installation destination has the optimal function for the application to operate. The image forming apparatus management server 108 displays the items 2001, 103 as 2004, and 2003 as components of the installation method selection screen 2000. According to the present embodiment, when the image forming apparatus 103 is selected as the installation destination image forming apparatus, step S1805 is executed.

In step S1807, the image forming apparatus management server 108 determines whether it is possible to construct a configuration with which the application can operate by operating cooperatively with other image forming apparatuses that the image forming apparatus management server 108 manages. The image forming apparatus management server 108 determines if it is possible to construct such a configuration based on the table 1300 and the required functions in the table 1100 acquired from the application delivery server 101. According to the determined result, the image forming apparatus management server 108 notifies the PC 112 of an image forming apparatus that should be linked with to construct a new virtual device.

The operations from step S1803 to step S1806 in a case in which the image forming apparatus 104 is selected as the installation destination image forming apparatus will now be described.

In step S1803, the image forming apparatus management server 108 searches the table 1400 and determines that the image forming apparatus 104 belongs to the virtual device VD1. Next, in step S1804, the image forming apparatus management server 108 searches the table 1400 to determine whether the configuration 1 or configuration 2 that are necessary in order for the application to operate can be constructed with the virtual device VD1. The functional configuration of the virtual device VD1 consists of a scan function and a facsimile sending function. In this case, the image forming apparatus management server 108 determines that the virtual device VD1 has neither the configuration 1 nor the configuration 2 that are necessary for the application to operate.

Next, the image forming apparatus management server 108 retrieves the functions of individual image forming apparatuses that comprise the virtual device VD1 from the table 1300. As the result of retrieval, it is found that the image forming apparatus 103 has a facsimile receiving function. The image forming apparatus management server 108 determines that by adding the facsimile receiving function 1306 of the image forming apparatus 103 as a function of the virtual device VD1 it is possible to install the application in the virtual device to which the selected image forming apparatus 104 belongs.

Figure 21:
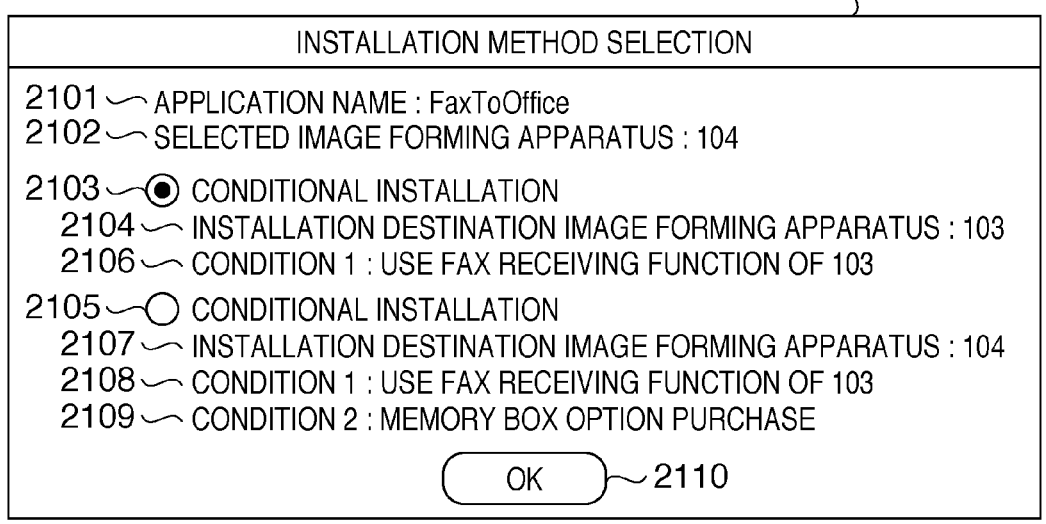
FIG. 21 is a view that illustrates an example of an installation method selection screen.

In step S1806, as a response to a "FaxToOffice" license purchase request from the PC 112 to the image forming apparatus 104, the image forming apparatus management server 108 displays an installation method selection screen 2100 as shown in FIG. 21. The screen illustrated in FIG. 21 corresponds to the selection screen shown in FIG. 20.

In this case, because an image forming apparatus that has the optimal function for the application to operate is not present in the virtual device, information relating to the optimal installation 2003 is not shown in FIG. 20. Based on the determination in step S1804, the image forming apparatus management server 108 displays information relating to two conditional installations at items 2104 to 2109.

Reference numeral 2104 denotes an image forming apparatus as an installation destination candidate. Reference numeral 2106 denotes a condition for installing the application in the image forming apparatus 103 denoted by reference numeral 2104, that is, a function that should be added. In this example, there are two kinds of conditional installation methods. Reference numeral 2105 denotes a second conditional installation method.

Reference numeral 2107 denotes an installation destination image forming apparatus. Reference numerals 2108 and 2109 denote conditions for the application to operate normally in the image forming apparatus 104 that is not the optimal configuration. In this example, it is shown that in order for the application to operate with the selected image forming apparatus, it is necessary to use the facsimile receiving function of the image forming apparatus 103 and also to add a memory box storage function to the image forming apparatus 104.

When the image forming apparatus management server 108 determines that an OK button 2110 is depressed, the image forming apparatus management server 108 performs the following processing in accordance with the selected installation method. In a case where the conditional installation 2103 is selected, the image forming apparatus management server 108 requests the license management server 102 to issue an application license, and also issues a virtual device configuration change request to the application 904 comprising the image forming management server.

Further, when the conditional installation 2105 is selected, in addition to the processing when the conditional installation 2103 is selected, the image forming apparatus management server 108 requests the license management server 102 to issue a memory box storage function license.

According to the present embodiment a case was described in which, as information holding destinations, the license management server 102 holds the table 1100, the application delivery server 101 holds the table 1200, and the image forming apparatus management server 108 holds the tables 1300 and 1400. However, the present invention is not limited thereto. For example, naturally information may be held in a server that is not mentioned in an example described in the present invention, or information may be held by the system overall.

According to the above-described embodiment, an example was described of a case in which a user of the PC 112 designates an application as an installation object and information specifying an image forming apparatus, and sends an application license purchase request to the image forming apparatus management server 108. However, it is also possible to designate a virtual device and not an image forming apparatus.

Figure 22:
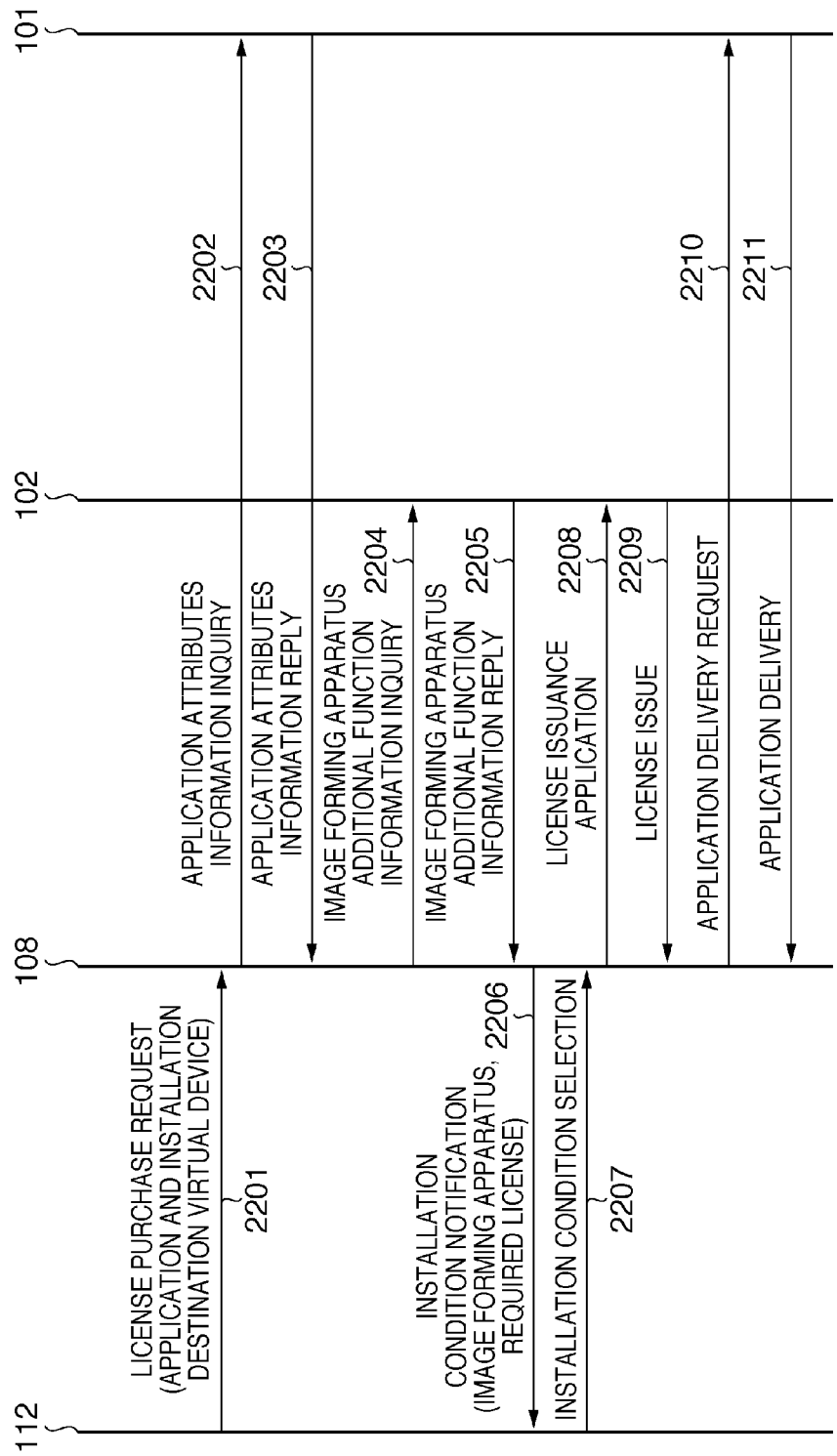
FIG. 22 is a view that illustrates a sequence relating to purchase of an application license in the case of specifying a virtual device.

FIG. 22 is a view that illustrates a sequence relating to purchase of an application license in the case of specifying a virtual device. First, in 2201, a user of the PC 112 specifies information that designates a virtual device and an application as an installation object, and sends an application license purchase request to the image forming apparatus management server 108. In 2202, the image forming apparatus management server 108 sends an inquiry to the application delivery server 101 regarding the image forming apparatus functions that are necessary for the notified application to operate. In 2203, the application delivery server 101 searches the table 1200 that is stored in the HDD 208 through the application information management program 805. The application delivery server 101 notifies the image forming apparatus management server 108 of one or more functional configurations for the image forming apparatus that are necessary for the notified application to operate that are obtained as the result of the search.

Using this notification the image forming apparatus management server 108 searches the tables 1300 and 1400 that are stored in the HDD 408 through the image forming apparatus management program 1005 based on the response from the application delivery server 101. As the result of the search, the image forming apparatus management server 108 determines whether a functional configuration of an image forming apparatus that is necessary for the application notified from the application delivery server 101 to operate is present. When it is determined that a required functional configuration is not present, in 2204 the image forming apparatus management server 108 sends an inquiry for additional function information to the license management server 102.

In 2205, the license management server 102 searches the table 1100 stored in the HDD 508 through the license management program 905, and notifies the additional function information to the image forming apparatus management server 108. In 2206, the image forming apparatus management server 108 notifies the installation destination devices and installation methods to the PC 112. In this connection, the installation destination devices and installation methods are determined by the image forming apparatus management program 905 performing operations that are described in detail later.

In 2207, the PC 112 selects an appropriate method among the installation methods that are notified by the image forming apparatus management server 108, and notifies the selected method to the image forming apparatus management server 108. In 2208, the image forming apparatus management server 108 requests the license management server 102 to issue the necessary license for the installation method that is selected by the PC 112. In 2209, the license management server 102 searches the license information that is stored in the HDD 308 through the license management program 905, and notifies a license that is necessary for installing an additional function or application to the image forming apparatus management server 108.

In 2210, the image forming apparatus management server 108 sends an application delivery request to the application delivery server 101. In 2211, the application delivery server 101 retrieves application information that is stored in the HDD 208 through the application information management program 805, and delivers the application that is requested by the image forming apparatus management server 108.

Figure 23:
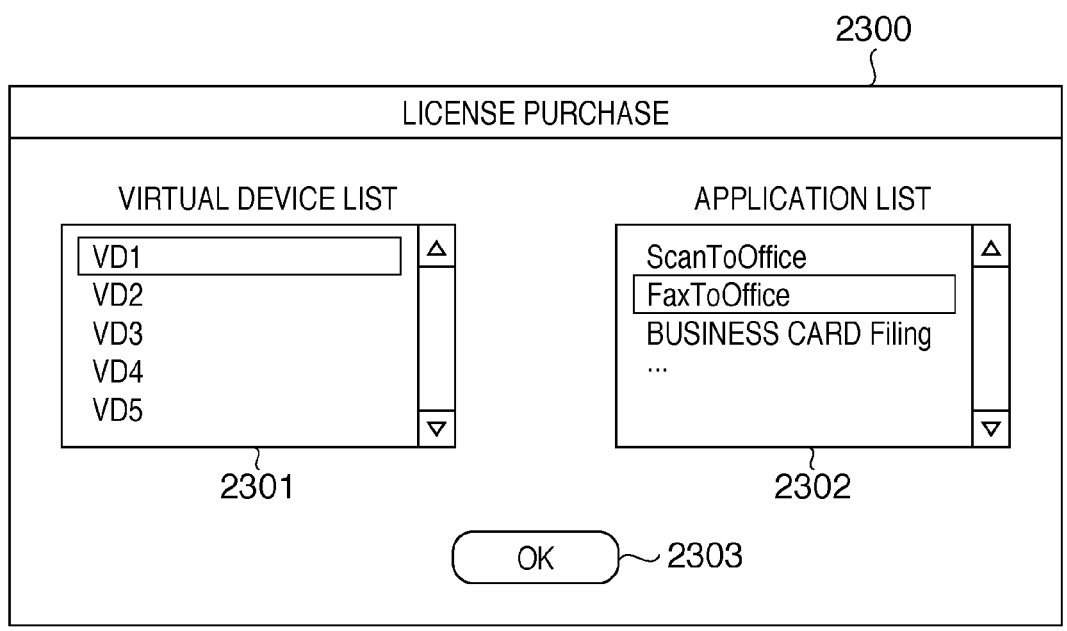
FIG. 23 is a view that illustrates an example of an operation screen for making an application license purchase request.

FIG. 23 is a view that illustrates an example of an operation screen for making an application license purchase request. A screen 2300 is a screen that is received by the image forming apparatus management server 108 via the network 110 and displayed on the display device 509. Reference numeral 2301 denotes a list of virtual devices as installation destinations for installing an application. Reference numeral 2302 denotes a list of applications. After a user selects a virtual device as the installation destination from the list 2301 and selects an application to be installed from the list 2302, the selection is confirmed by depressing an OK button 2303. Thereby, information regarding the virtual device that is selected as the installation destination and the selected application to be installed are notified to the image forming apparatus management server 108.

Figure 24:
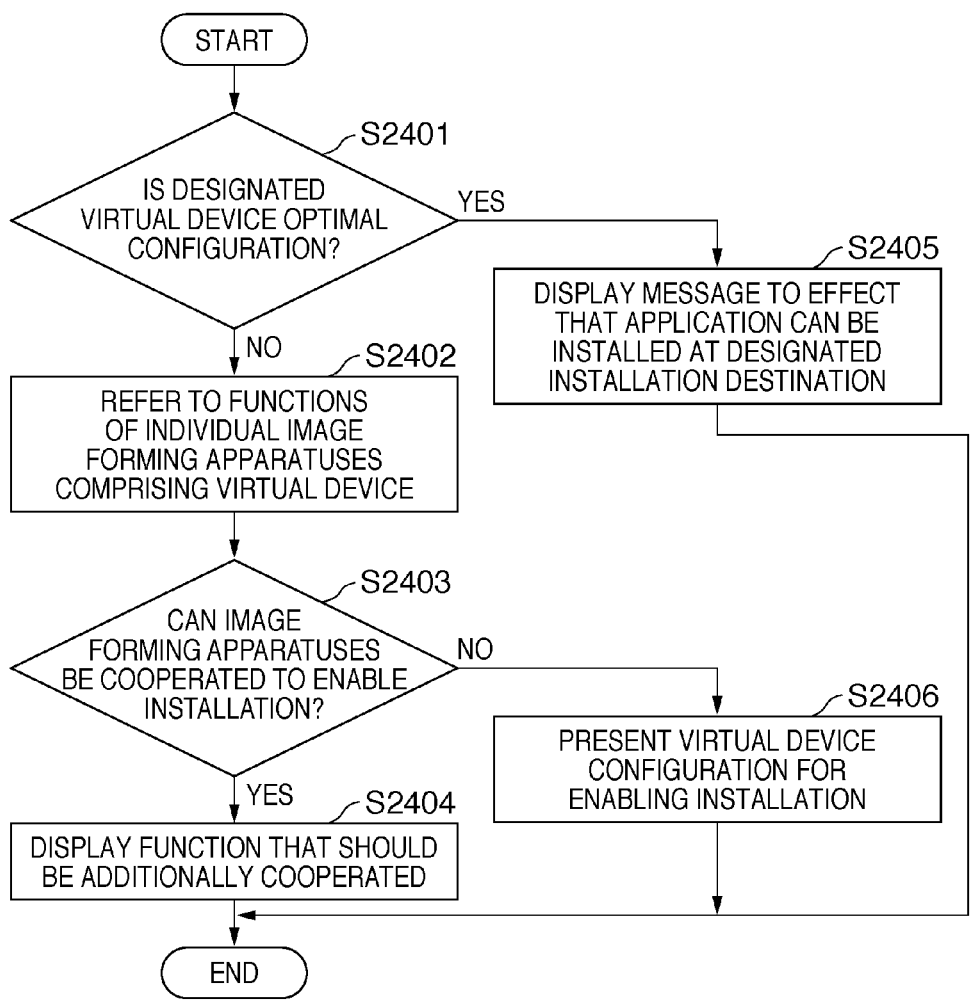
FIG. 24 is a flowchart that illustrates processing performed in S1704 shown in FIG. 17.

FIG. 24 is a flowchart that illustrates processing performed in S1704 shown in FIG. 17. In step S2401, it is determined whether the virtual device that is selected as the installation destination on the screen shown in FIG. 23 is optimal as the installation destination of the application that is similarly selected. Hereunder, an example is described of a case in which the virtual device VD1 is selected and "FaxToOffice" is selected as the application.

First, the image forming apparatus management server 108 sends an inquiry to the application delivery server 101 regarding the image forming apparatus function that is necessary for installing the selected application. Two kinds of functional configurations are defined with respect to the functional configuration that is necessary to install the "FaxToOffice" application. The application delivery server 101 sends a reply to the effect that there are two configurations to the image forming apparatus management server 108. The first configuration represents the optimal configuration. The second and subsequent configurations represent alternative configurations for a case where the selected virtual device does not have the optimal configuration. The facsimile receiving function 1207 is notified as the first configuration, and the memory box storage function 1208 and the remote fax function 1210 are notified as the second configuration from the application delivery server 101 to the image forming apparatus management server 108.

Next, the image forming apparatus management server 108 retrieves the functions of the selected virtual device from the table 1400 and compares those functions with the necessary image forming apparatus function(s) notified by the application delivery server 101. If the image forming apparatus management server 108 determines as the comparison result that the selected virtual device has the necessary function(s), the image forming apparatus management server 108 executes step S2405. If it is determined that the selected virtual device does not have the required function(s), the image forming apparatus management server 108 executes the processing of step S2402 onwards.

In this case, since the virtual device VD1 that is selected does not have the facsimile receiving function 1406, the image forming apparatus management server 108 executes the processing of step S2402 onwards. In this connection, if the virtual device VD2 were selected, and not the virtual device VD1, because the virtual device VD2 has the facsimile receiving function according to the first configuration for executing the application, the image forming apparatus management server 108 would determine that the selected virtual device has the function necessary to execute the "FaxToOffice" application and would therefore execute step S2405.

Next, in step S2402, the image forming apparatus management server 108 retrieves the functions of the individual image forming apparatuses that comprise the selected virtual device. In step S2403, the image forming apparatus management server 108 determines whether or not the image forming apparatuses comprising the selected virtual device have the function(s) necessary for the application to operate. If the determination result shows that the image forming apparatuses have the necessary functions but are not cooperated with each other, the image forming apparatus management server 108 executes step S2404. If the determination result shows that the image forming apparatuses do not have the necessary functions, the image forming apparatus management server 108 executes step S2406.

Although the selected virtual device VD1 does not have the facsimile receiving function 1306, the image forming apparatus management server 108 searches the table 1300 and determines as a result that the image forming apparatus 103 comprising the virtual device VD1 has a facsimile receiving function. Therefore, the image forming apparatus management server 108 adds the facsimile receiving function 1306 of the image forming apparatus 103 as a function of the virtual device VD1. It is therefore possible to install the application in the virtual device to which the selected image forming apparatus 104 belongs.

As described above, since the virtual device VD1 can form a second configuration for executing the "FaxToOffice" application, the processing of step S2404 and onward is performed. In step S2404, the image forming apparatus management server 108 displays an installation method selection screen as shown in FIG. 25 as the response to a "FaxToOffice" license purchase request from the PC 112 to the virtual device VD1.

FIG. 25 is a view that illustrates an example of an installation method selection operation screen that is sent from the image forming apparatus management server 108 to the PC 112. This screen is received from the image forming apparatus management server 108 via the network 110 and displayed on the display device 509.

Reference numeral 2501 denotes the application name of the application to be installed that is selected at the PC 112. Reference numeral 2502 denotes the virtual device as the installation destination that is selected at the PC 112. In this case, the screen illustrates a case in which the selected virtual device does not include an image forming apparatus that is the optimal installation destination.

Reference numeral 2503 denotes an image forming apparatus that can be the installation destination of the application shown in the selected virtual device 2502 if a condition is satisfied. Reference numeral 2504 denotes a condition for the application to operate normally at the image forming apparatus 104 in the virtual device that does not have the optimal configuration. According to this example, in order for the application to operate with the selected virtual device VD1, it is necessary to link with the facsimile receiving function of the image forming apparatus 103 that is one component of the virtual device VD1.

In step S2405, it is notified that the virtual device that is selected as the installation destination has the optimal function for application operation. The unshown notification contents are the application name 2501, the virtual device name 2502, the installation destination image forming apparatus 2503, and an OK button 2505.

In step S2406, the image forming apparatus management server 108 determines in the following manner whether it is possible to construct a configuration with which the application can operate by operating cooperatively with other image forming apparatuses that the image forming apparatus management server 108 manages. The image forming apparatus management server 108 performs the determination based on the table 1300 and the necessary function(s) acquired from the application delivery server 101. The image forming apparatus management server 108 then notifies the PC 112 of an image forming apparatus that should be cooperated with to constitute a new virtual device as the result that is determined.

According to the present embodiment, the following advantages are achieved by combining information regarding the functions of individual image forming apparatuses and information regarding the functions of virtual devices consisted of a plurality of image forming apparatuses, which operates cooperatively.

Even though an image forming apparatus that is specified as an installation destination does not have a function that is necessary to operate an application, as long as the virtual device to which the image forming apparatus has the necessary function the application can be installed.

Further, because an alternative configuration with respect to functions necessary for operating an application is also indicated, and not just an optimal configuration, the opportunities in which an application can be installed increase.

The present invention may either be applied to a system composed of a plurality of apparatuses (e.g. a host computer, interface equipment, a reader, and a printer) or to a single apparatus (e.g. a copying machine or a facsimile machine).

It is to be understood that the object of the present invention may also be accomplished by supplying a system or an apparatus with a storage medium in which a program code of software which realizes the functions of the above described embodiment is stored, and causing a computer (a CPU or MPU) of the system or apparatus to read out and execute the program code stored in the storage medium.

In this case, the program code itself read from the computer-readable storage medium realizes the functions of the above described embodiment, and hence the program code and the storage medium in which the program code is stored constitutes the present invention.

Examples of the storage medium for supplying the program code include a flexible disk, a hard disk, an optical disk, a magnetic-optical disk, a CD-ROM, a CD-R, a magnetic tape, a non-volatile memory card, and a ROM.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-260359, filed Oct. 3, 2007, which is hereby incorporated by reference herein in its entirety.

What is claimed is:

1. An image formation system comprising:
   a managing unit that manages both information on image forming functions of each of a plurality of image forming apparatuses, and information on a virtual device having one or more image forming functions realized by cooperatively using one or more of the image forming functions from the plurality of image forming apparatuses;
   a reception unit that accepts an instruction that designates an application program to be installed and an apparatus that is an installation destination of the application program;
   a determining unit that determines whether or not the application program to be installed operates on the apparatus that is the installation destination based on the functions that are managed by said managing unit; and
   a selecting unit that, according to a result of the determination, displays an apparatus as an installation destination for installing the application program and an installation method, to allow a user to select the apparatus as the installation destination and the installation method, and
   wherein the selecting unit displays an installation method of installing the designated application program in another image forming apparatus which is not designated and is different from the designated image forming apparatus, in a case where the installation destination of the application program is a single image forming apparatus, and
   wherein the selecting unit displays an installation method to realize a function equivalent to the designated application program by installing a specific application in an image forming apparatus having a specific image forming function in a case where the installation destination of the application program is a virtual device, and
   wherein the image forming apparatus being the virtual device.

2. The system according to claim 1, wherein said managing unit also manages a function necessary for execution of the application program, and a virtual device having the relevant function as a combination of the image forming apparatuses.

3. The system according to claim 1, wherein when the application program does not operate on the apparatus that is the installation destination, said selecting unit displays an image forming apparatus comprising a virtual device on which the application program operates and a necessary condition, to allow a user to select the image forming apparatus and the necessary condition.

4. The system according to claim 1, further comprising a unit that purchases a license of the application program and a license that is necessary for execution of the application program.

5. A method of installing an application program that is executed by an image formation system comprising the steps of:
   managing both information on image forming functions of each of a plurality of image forming apparatuses, and information on a virtual device having one or more image forming functions realized by cooperatively using one or more of the image forming functions from the plurality of image forming apparatuses;
   accepting an instruction that designates an application program to be installed and an apparatus that is an installation destination of the application program;

determining whether or not the application program to be installed operates on the apparatus that is the installation destination based on the functions that are managed; and according to a result of the determination, displaying an apparatus as an installation destination for installing the application program and an installation method to allow a user to select the apparatus as the installation destination and the installation method, and wherein an installation method of installing the designated application program in another image forming apparatus which is not designated and is different from the designated image forming apparatus is displayed in a case where the installation destination of the application program is a single image forming apparatus, and wherein an installation method to realize a function equivalent to the designated application program by installing a specific application in an image forming apparatus having a specific image forming function is displayed in a case where the installation destination of the application program is a virtual device, the image forming apparatus being the virtual device.

6. A non-transitory computer-readable storage medium, storing a program for causing a computer to execute a method of installing an application program, the method comprising the steps of:

managing both information on image forming functions of each of a plurality of image forming apparatuses, and information on a virtual device having one or more image forming functions realized by cooperatively using one or more of the image forming functions from the plurality of image forming apparatuses;

accepting an instruction that designates an application program to be installed and an apparatus that is an installation destination of the application program;

determining whether or not the application program to be installed operates on the apparatus that is the installation destination based on the functions that are managed; and according to a result of the determination, displaying an apparatus as an installation destination for installing the application program and an installation method to allow a user to select the apparatus as the installation destination and the installation method, and wherein an installation method of installing the designated application program in another image forming apparatus which is not designated and is different from the designated image forming apparatus is displayed in a case where the installation destination of the application program is a single image forming apparatus, and wherein an installation method to realize a function equivalent to the designated application program by installing a specific application in an image forming apparatus having a specific image forming function is displayed in a case where the installation destination of the application program is a virtual device, the image forming apparatus being the virtual device.

* * * * *